(12) United States Patent
Sugiyama

(10) Patent No.: US 12,498,479 B2
(45) Date of Patent: Dec. 16, 2025

(54) DISTANCE MEASURING DEVICE AND DISTANCE MEASURING METHOD

(71) Applicant: SONY SEMICONDUCTOR SOLUTIONS CORPORATION, Kanagawa (JP)

(72) Inventor: Toshinobu Sugiyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1084 days.

(21) Appl. No.: 17/424,345

(22) PCT Filed: Jan. 15, 2020

(86) PCT No.: PCT/JP2020/000960
§ 371 (c)(1),
(2) Date: Jul. 20, 2021

(87) PCT Pub. No.: WO2020/158378
PCT Pub. Date: Aug. 6, 2020

(65) Prior Publication Data
US 2022/0113410 A1    Apr. 14, 2022

(30) Foreign Application Priority Data

Jan. 29, 2019  (JP) ................. 2019-013288
Feb. 25, 2019  (JP) ................. 2019-031294

(51) Int. Cl.
*G01S 17/10* (2020.01)
*G01S 7/484* (2006.01)
*G01S 7/4865* (2020.01)

(52) U.S. Cl.
CPC .............. *G01S 17/10* (2013.01); *G01S 7/484* (2013.01); *G01S 7/4865* (2013.01)

(58) Field of Classification Search
None
See application file for complete search history.

(56) References Cited

U.S. PATENT DOCUMENTS

| | | | |
|---|---|---|---|
| 2006/0139620 A1* | 6/2006 | Hopwood | G01S 7/486 356/5.1 |
| 2010/0053405 A1 | 3/2010 | Lehmann et al. | |

(Continued)

FOREIGN PATENT DOCUMENTS

| | | |
|---|---|---|
| CN | 102187658 A | 9/2011 |
| CN | 105723239 A | 6/2016 |

(Continued)

OTHER PUBLICATIONS

International Search Report and Written Opinion of PCT Application No. PCT/JP2020/000960, issued on Mar. 10, 2020, 10 pages of ISRWO.

(Continued)

*Primary Examiner* — Hovhannes Baghdasaryan
(74) *Attorney, Agent, or Firm* — CHIP LAW GROUP

(57) ABSTRACT

Provided is a distance measuring device that includes a light emitter that emits irradiation light; a light receiver that receives reflected light resulting from reflection of the irradiation light on a target object, a calculator that calculates a distance to the target object on the basis of a time from emission of the irradiation light to reception of the reflected light, and a light emission controller that controls the light emitter. The light emission controller controls emission by the light emitter by switching a first emission mode and a second emission mode different from the first emission mode within a predetermined frame.

15 Claims, 14 Drawing Sheets

(56) References Cited

U.S. PATENT DOCUMENTS

2013/0258099 A1   10/2013  Ovsiannikov et al.
2017/0003392 A1*   1/2017  Bartlett .................. G01S 17/42
2018/0227475 A1    8/2018  Kishimoto et al.

FOREIGN PATENT DOCUMENTS

| | | |
|---|---|---|
| CN | 106461763 A | 2/2017 |
| CN | 108027238 A | 5/2018 |
| CN | 108139482 A | 6/2018 |
| EP | 1659418 A1 * | 5/2006 ............. G01S 17/08 |
| EP | 3361283 A1 | 8/2018 |
| JP | 2012-501608 A | 1/2012 |
| JP | 2012-215481 A | 11/2012 |
| JP | 2013-076645 A | 4/2013 |
| JP | 5675469 B2 | 2/2015 |
| JP | 2016-090268 A | 5/2016 |
| JP | 2017-191042 A | 10/2017 |
| JP | 2018009917 A | 1/2018 |
| KR | 10-2013-0111130 A | 10/2013 |
| WO | 2010/025331 A1 | 3/2010 |
| WO | 2017/061104 A1 | 4/2017 |

OTHER PUBLICATIONS

Xiaoyu Ma, "Design of Laser Range Finder for Obstacle Avoidance of Intelligent Robot in Cloud Computing Environment", Aug. 31, 2017; p. 110-113, Bulletin of Science and Technology, vol. 33 No. 8.
Heng Hu et al, "Influence of modulation function on precision of laser ranging based on polarization modulation", Oct. 25, 2018, pp. 188-194, Infrared and Laser Engineering, vol. 47 No. 10.

* cited by examiner

DISTANCE MEASURING DEVICE AND DISTANCE MEASURING METHOD

CROSS REFERENCE TO RELATED APPLICATIONS

This application is a U.S. National Phase of International Patent Application No. PCT/JP2020/000960 filed on Jan. 15, 2020, which claims priority benefit of Japanese Patent Application No. JP 2019-031294 filed in the Japan Patent Office on Feb. 25, 2019 and also claims priority benefit of Japanese Patent Application No. JP 2019-013288 filed in the Japan Patent Office on Jan. 29, 2019. Each of the above-referenced applications is hereby incorporated herein by reference in its entirety.

TECHNICAL FIELD

The present technology relates to a distance measuring device, a distance measuring method, and a program, and more particularly to a distance measuring device, a distance measuring method, and a program that enable suppression of interference, for example.

BACKGROUND ART

In recent years, advances in semiconductor technology have led to miniaturization of distance measuring devices that measure the distance to an object. This makes it possible to install the distance measuring devices in, for example, so-called mobile terminals, such as smartphones, which are small information processing devices having communication functions.

Examples of distance measuring devices (sensors) that measure the distance to a target object include time of flight (TOF) sensors (see, for example, Patent Document 1).

The TOF sensor emits irradiation light which is light emitted to a target object, and receives reflected light resulting from reflection of the irradiation light on the target object, thereby obtaining a time from the emission of the irradiation light to the reception of the reflected light, that is, a time $\Delta t$ until the irradiation light is reflected by the target object and returns. Then, using the time $\Delta t$ and the speed of light c [m/s], the distance L to the target object is obtained according to an equation $L = c \times \Delta t/2$.

CITATION LIST

Patent Document

Patent Document 1: Japanese Patent Application Laid-Open No. 2016-090268
Patent Document 2: Japanese Patent Application Laid-Open No. 2017-191042
Patent Document 3: Japanese Patent Application Laid-Open No. 2013-076645

SUMMARY OF THE INVENTION

Problems to be Solved by the Invention

In recent years, practical application of automatic driving has been required, and in automatic driving, distance measurement for measuring the distance to an object present around the vehicle is indispensable. In a case where a TOF sensor is used for such distance measurement, it is presumed that a plurality of TOF sensors will be mounted on a vehicle in order to measure the distance to an object present in each direction of the vehicle.

In this case, it is presumed that interference occurs in which irradiation light (irradiation light itself or reflected light of the irradiation light) emitted by one of a plurality of TOF sensors mounted on the vehicle is received by another TOF sensor.

Further, if the number of vehicles that perform automatic driving increases, it is presumed that interference occurs in which irradiation light emitted by a TOF sensor mounted on one vehicle is received by a TOF sensor mounted on another vehicle.

If interference occurs among the TOF sensors, the accuracy of distance measurement will decrease.

In order to suppress interference, Patent Document 2 proposes that the time to emit a pulse pattern of irradiation light is delayed by a time calculated by a pseudo-random number for each model so that emission timings do not overlap among models. Further, Patent Document 3 proposes a method of extending the pulse width of irradiation light by the time calculated by a pseudo-random number.

However, focusing on the distance measurement operation of each model, a non-emission time increases, so that the total amount of received light may decrease, and thus, the distance measurement sensitivity may deteriorate, according to Patent document 2 or Patent document 3.

The present technology has been made in view of the above circumstances, and is intended to suppress interference and maintain the accuracy of distance measurement.

Solutions to Problems

A distance measuring device according to one aspect of the present technology includes: a light emitter that emits irradiation light; a light receiver that receives reflected light resulting from reflection of the irradiation light on a target object; a calculator that calculates a distance to the target object on the basis of a time from emission of the irradiation light to reception of the reflected light; and a light emission controller that controls the light emitter, in which the light emission controller controls emission by the light emitter by switching a first emission mode and a second emission mode different from the first emission mode within a predetermined frame.

A distance measuring method according to one aspect of the present technology includes: emitting irradiation light; receiving reflected light resulting from reflection of the irradiation light on a target object; calculating a distance to the target object on the basis of a time from emission of the irradiation light to reception of the reflected light; and controlling emission of the irradiation light, the method being executed by a distance measuring device that performs a distance measurement process, in which, in the control of emission, a first emission mode and a second emission mode different from the first emission mode are switched within a predetermined frame to control emission.

A program according to one aspect of the present technology causes a computer of a distance measuring device that performs a distance measurement process to execute processing including: emitting irradiation light; receiving reflected light resulting from reflection of the irradiation light on a target object; calculating a distance to the target object on the basis of a time from emission of the irradiation light to reception of the reflected light; and controlling emission of the irradiation light, the processing including, during the control of emission, switching between a first emission mode and a second emission mode different from the first emission mode within a predetermined frame to control emission.

In the distance measuring device, the distance measuring method, and the program according to one aspect of the present technology, irradiation light is emitted, reflected light resulting from reflection of the irradiation light on the target object is received, and the distance to the target object is calculated on the basis of a time from emission of the irradiation light to reception of the reflected light. The emission of the irradiation light is controlled by switching between a first emission mode and a second emission mode different from the first emission mode within a predetermined frame.

Note that the distance measuring device may be an independent device or an internal block constituting one apparatus.

In addition, the program can be provided by being transmitted via a transmission medium or by being recorded on a recording medium.

MODE FOR CARRYING OUT THE INVENTION

A mode (hereinafter referred to as an embodiment) for carrying out the present technology will be described.

The present technology can be applied to, for example, a light receiving element constituting a distance measuring system that measures a distance by an indirect TOF method, an imaging device having such a light receiving element, and the like.

For example, the distance measuring system can be applied to an in-vehicle system that is mounted on a vehicle and measures the distance to a target object outside the vehicle, a system for gesture recognition that measures the distance to a target object such as a user's hand, and recognizes the gesture of the user on the basis of the measurement result, or the like. In this case, the result of gesture recognition can be used, for example, for operating a car navigation system, etc.

<Configuration Example of Distance Measuring Device>

Figure 1:
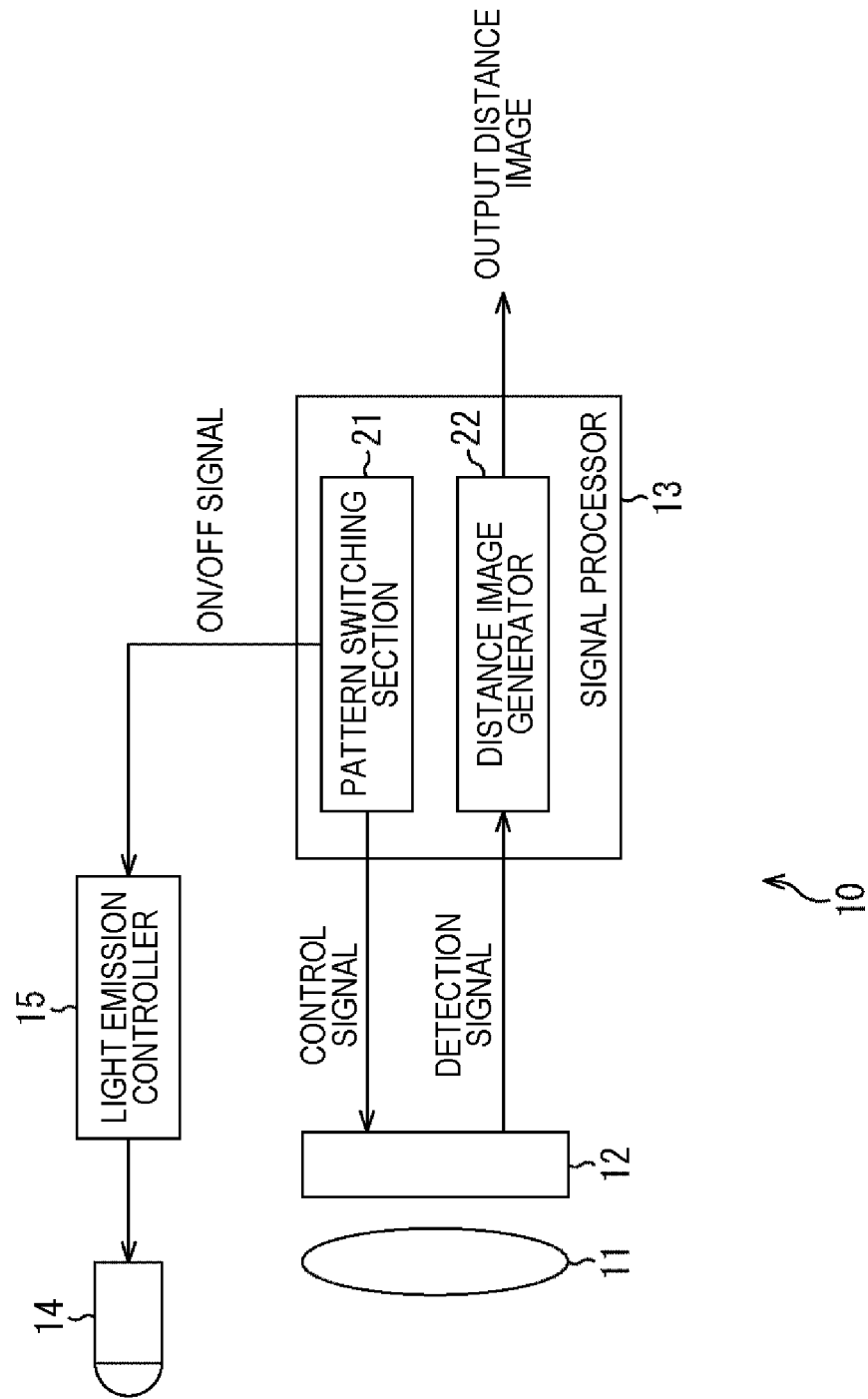
FIG. 1 is a diagram showing a configuration of an embodiment of a distance measuring device to which the present technology is applied.

FIG. 1 shows a configuration example of an embodiment of a distance measuring device to which the present technology is applied.

A distance measuring device 10 includes a lens 11, a light receiver 12, a signal processor 13, a light emitter 14, and a light emission controller 15. The signal processor 13 includes a pattern switching section 21 and a distance image generator 22. The distance measuring device 10 in FIG. 1 measures the distance to an object by irradiating the object with light and receiving light (reflected light) resulting from reflection of the light (irradiation light) on the object.

A light emitting system of the distance measuring device 10 includes the light emitter 14 and the light emission controller 15. In the light emitting system, the light emission controller 15 causes the light emitter 14 to emit infrared light (IR) in accordance with the control from the signal processor 13. An IR band filter may be provided between the lens 11 and the light receiver 12, and the light emitter 14 may emit infrared light corresponding to the transmission wavelength band of the IR bandpass filter.

The light emitter 14 may be provided inside a housing of the distance measuring device 10 or may be provided outside the housing of the distance measuring device 10. The light emission controller 15 causes the light emitter 14 to emit light in a predetermined pattern, as will be described later. This pattern is set by the pattern switching section 21 and can be switched at a predetermined timing.

The signal processor 13 functions as, for example, a calculator that calculates the distance from the distance measuring device 10 to the object on the basis of an image signal supplied from the light receiver 12. In a case where the calculated distance is output as an image, the distance image generator 22 of the signal processor 13 generates and outputs a distance image in which the distance to the object is represented for each pixel.

<Configuration of Imaging Element>

Figure 2:
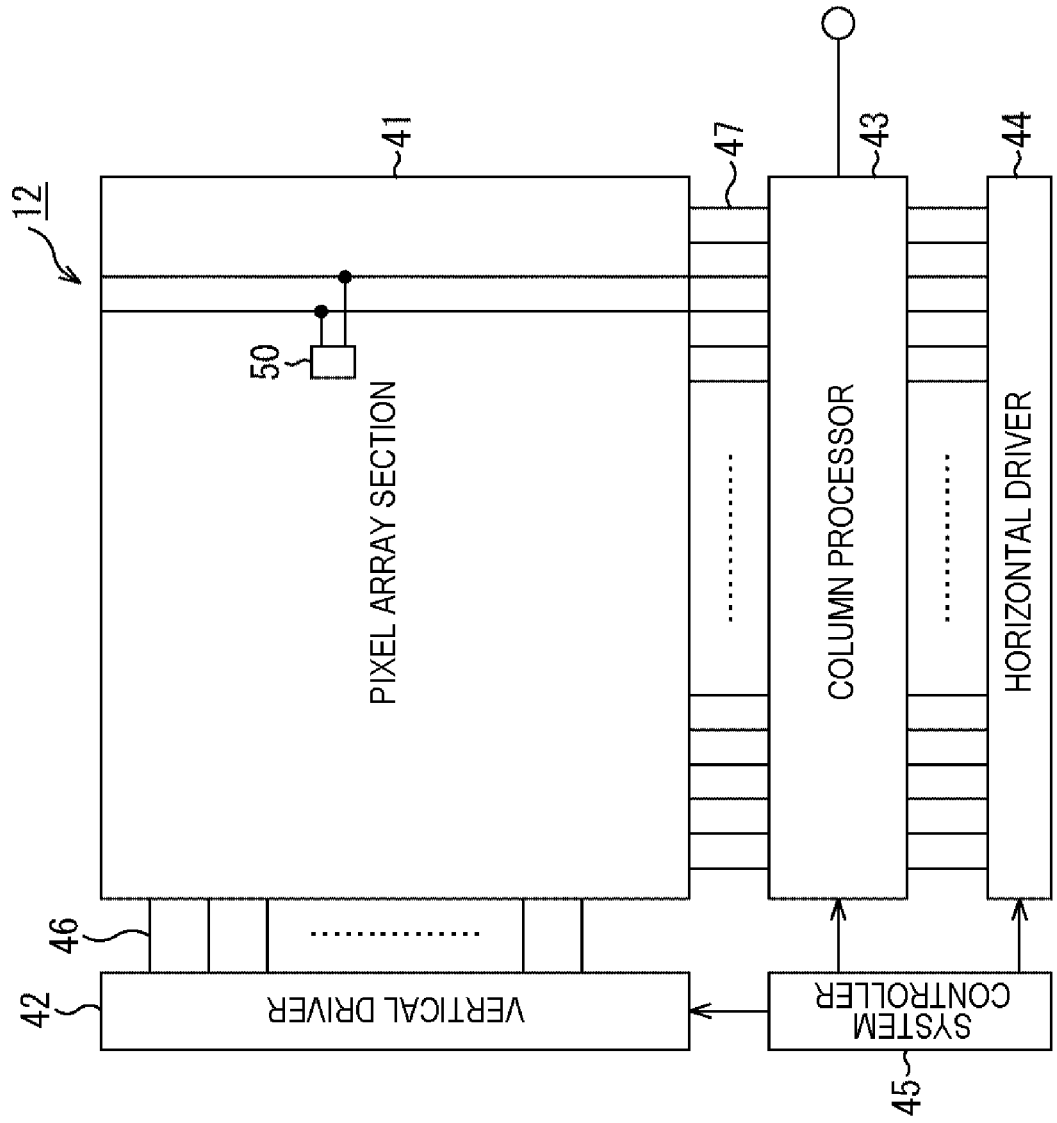
FIG. 2 is a diagram showing a configuration example of a light receiver.

FIG. 2 is a block diagram showing a configuration example of the light receiver 12. The light receiver 12 can be a complementary metal oxide semiconductor (CMOS) image sensor.

The light receiver 12 includes a pixel array section 41, a vertical driver 42, a column processor 43, a horizontal driver 44, and a system controller 45. The pixel array section 41, the vertical driver 42, the column processor 43, the horizontal driver 44, and the system controller 45 are formed on a semiconductor substrate (chip) not shown.

In the pixel array section 41, unit pixels (for example, a pixel 50 in FIG. 3) are two-dimensionally arrayed in a matrix, each unit pixel having a photoelectric conversion element that generates photoelectric charges in an amount corresponding to the amount of incident light and stores the generated photoelectric charges therein. Note that, in the following, photoelectric charges in an amount corresponding to the amount of incident light may be simply referred to as "electric charges", and the unit pixel may be simply referred to as "pixel".

The pixel array section 41 is also provided with pixel drive lines 46 and vertical signal lines 47 with respect to the pixels arrayed in a matrix. The pixel drive lines 46 are formed for each row along the horizontal direction (arraying direction of pixels in each pixel row) in the figure, and the vertical signal lines 47 are formed for each column along the vertical direction (arraying direction of pixels in each column) in the figure. One ends of the pixel drive lines 46 are connected to output ends of the vertical driver 42 corresponding to the respective rows.

The vertical driver 42 is a pixel driver that includes a shift register, an address decoder, and the like, and that drives all pixels in the pixel array section 41 simultaneously or drives the pixels in the pixel array section 41 on, for example, a row-by-row basis. Pixel signals output from the unit pixels in the pixel row selectively scanned by the vertical driver 42 are supplied to the column processor 43 through the corresponding vertical signal lines 47. The column processor 43 performs, for each pixel column of the pixel array section 41, a predetermined signal process on pixel signals output from the unit pixels in the selected row through the vertical signal lines 47, and temporarily stores the pixel signals which have been subjected to the predetermined signal process.

Specifically, the column processor 43 performs at least a noise removal process, for example, a correlated double sampling (CDS) process as a signal process. Due to the correlated double sampling by the column processor 43, fixed pattern noise unique to pixels, such as reset noise and variation in threshold value of an amplifier transistor, is removed. Note that the column processor 43 may have, for example, an analog-to-digital (AD) conversion function in addition to the noise removal function, and output a signal level in digital form.

The horizontal driver 44 includes a shift register, an address decoder, and the like, and selects one by one a unit circuit corresponding to each column of pixels in the column processor 43. Due to the selective scanning by the horizontal driver 44, the pixel signals subjected to the signal process by the column processor 43 are sequentially output to the signal processor 48.

The system controller 45 includes a timing generator that generates various types of timing signals, and the like, and controls drives of the vertical driver 42, the column processor 43, the horizontal driver 44, and the like on the basis of various types of timing signals generated by the timing generator.

In the pixel array section 41, with respect to the pixel array matrix, the pixel drive line 46 extends along the row direction for each pixel row, and two vertical signal lines 47 extend along the column direction for each pixel column. For example, the pixel drive line 46 transmits a drive signal for performing driving to read a signal from a pixel. Note that, although FIG. 1 shows one wiring line for the pixel drive line 46, the number of wiring lines of the pixel drive line 46 is not limited to one. One ends of the pixel drive lines 46 are connected to output ends of the vertical driver 42 corresponding to the respective rows.

<Structure of Unit Pixel>

Next, a specific structure of each of the unit pixels 50 arrayed in a matrix in the pixel array section 41 will be described.

The pixel 50 is configured such that electric charges generated by one photodiode 61 are distributed to taps 51-1 and 51-2. Then, the electric charges distributed to the tap 51-1 from among the electric charges generated by the photodiode 61 are read out from a vertical signal line 47-1 and output as a detection signal SIG1. Further, the electric charges distributed to the tap 51-2 are read out from a vertical signal line 47-2 and output as a detection signal SIG2.

The tap 51-1 includes a transfer transistor 62-1, a floating diffusion (FD) section 63-1, a selection transistor 64-1, and a reset transistor 65-1. Similarly, the tap 51-2 includes a transfer transistor 62-2, an FD section 63-2, a selection transistor 64-2, and a reset transistor 65-2.

The distribution of electric charges in the pixel 50 will be described with reference to FIG. 4. Here, the distribution means that the electric charges accumulated in the pixel 50 (photodiode 31) are read out at different timings, so that the electric charges are read out for each tap.

Figure 4:
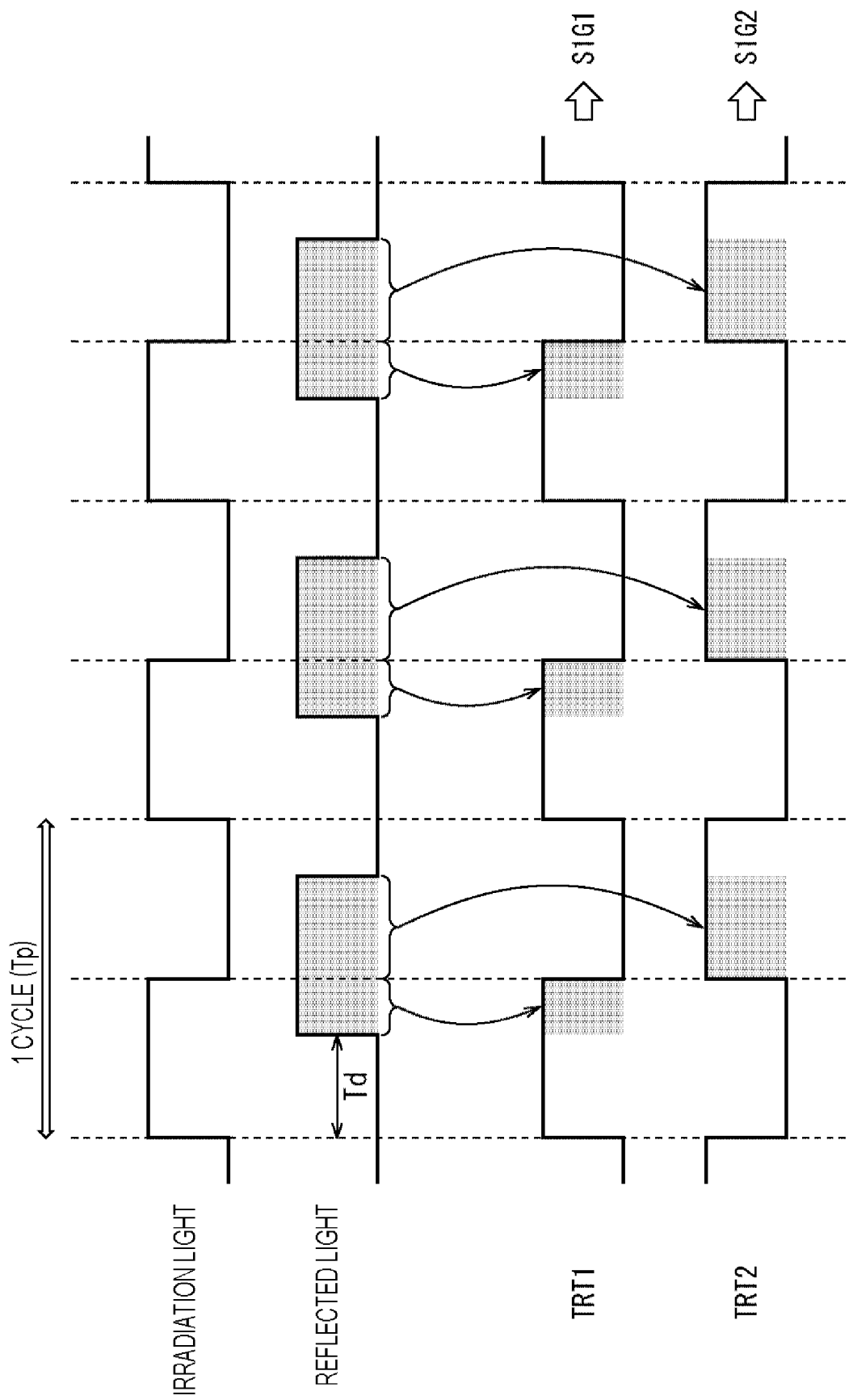
FIG. 4 is a diagram for describing distribution of electric charges in the pixel.

As shown in FIG. 4, irradiation light modulated (1 cycle=Tp) so as to repeat on/off of emission in an irradiation time T is output from the light emitter 14, and the reflected light is received by the photodiode 61 with a delay of a delay time Td according to the distance to the object. Further, a transfer control signal TRT1 controls on/off of the transfer transistor 62-1, and a transfer control signal TRT2 controls on/off of the transfer transistor 62-2. As illustrated, the transfer control signal TRT1 has the same phase as the irradiation light, while the transfer control signal TRT2 has a phase obtained by inverting the phase of the transfer control signal TRT1.

Therefore, electric charge generated when the photodiode 61 receives the reflected light is transferred to the FD section 63-1 while the transfer transistor 62-1 is on according to the transfer control signal TRT1. Further, electric charge is transferred to the FD section 63-2 while the transfer transistor 62-2 is on according to the transfer control signal TRT2. Thus, during a predetermined period in which emission of the irradiation light with the irradiation time T is periodically performed, the electric charges transferred via the transfer transistor 62-1 are sequentially accumulated in the FD section 63-1, and the electric charges transferred via the transfer transistor 62-2 are sequentially accumulated in the FD section 63-2.

Then, when the selection transistor 64-1 is turned on according to a selection signal SELm1 after the end of the period in which electric charges are accumulated, the electric charges accumulated in the FD section 63-1 are read out via the vertical signal line 47-1, and a detection signal SIG1 corresponding to the amount of electric charges is output from the light receiver 12. Similarly, when the selection transistor 64-2 is turned on according to a selection signal SELm2, the electric charges accumulated in the FD section 63-2 are read out via the vertical signal line 47-2, and a detection signal SIG2 corresponding to the amount of electric charges is output from the light receiver 12.

The electric charges accumulated in the FD section 63-1 are discharged when the reset transistor 65-1 is turned on according to a reset signal RST_A. The electric charges accumulated in the FD section 63-2 are discharged when the reset transistor 65-2 is turned on according to a reset signal RST_B.

In this way, the pixel 50 can distribute the electric charges generated by the reflected light received by the photodiode 61 to the taps 51-1 and 51-2 according to the delay time Td, and output detection signal SIG1 and detection signal SIG2. Then, the delay time Td corresponds to the time required by light emitted from the light emitter 14 to travel to the object and return to the light receiver 12 after being reflected by the object, that is, the distance to the object. Therefore, the distance measuring device 10 can obtain the distance (depth) to the object according to the delay time Td on the basis of the detection signal SIG1 and the detection signal SIG2.

<Indirect TOF Distance Measuring Method>

Calculation of distance using indirect TOF method in the double-tap structure in which electric charges accumulated in one photodiode 61 are read using two taps 51 as described above will be described with reference to FIG. 5. To compare with the distance measuring method to which the present technology is applied, which will be described later with reference to FIG. 6 and subsequent figures, the conventional distance measuring method will be described with reference to FIG. 5. In the description with reference to FIG. 5, a 2-tap/4-phase method, which is a detection method using two taps and four phases (Phases), will be described as an example.

The one-frame period for generating a distance image is divided into two signal detection periods, an A frame and a B frame. The one-frame period for generating a distance image is set to, for example, about 1/30 seconds. Therefore, the period of the A frame and the period of the B frame are each about 1/60 seconds.

The light emitter 14 (FIG. 1) outputs irradiation light modulated (1 cycle=Tp) so as to repeat on/off of emission within the irradiation time Tp. The irradiation time Tp can be set to, for example, about 10 ns. The light receiver 12 receives the reflected light with a delay time Td according to the distance to the object.

In the 4-phase method, the light receiver 12 receives light by either the tap 51-1 or the tap 51-2 at four timings which are the timing at which the phase is the same as that of the irradiation light (Phase 0), the timing at which the phase is shifted by 90 degrees (Phase 90), the timing at which the phase is shifted by 180 degrees (Phase 180), and the timing at which the phase is shifted by 270 degrees (Phase 270). Note that the reception of light here includes the process up to transferring electric charges generated in the photodiode 61 to the FD section 63 by turning on the transfer transistor 62.

Figure 5:
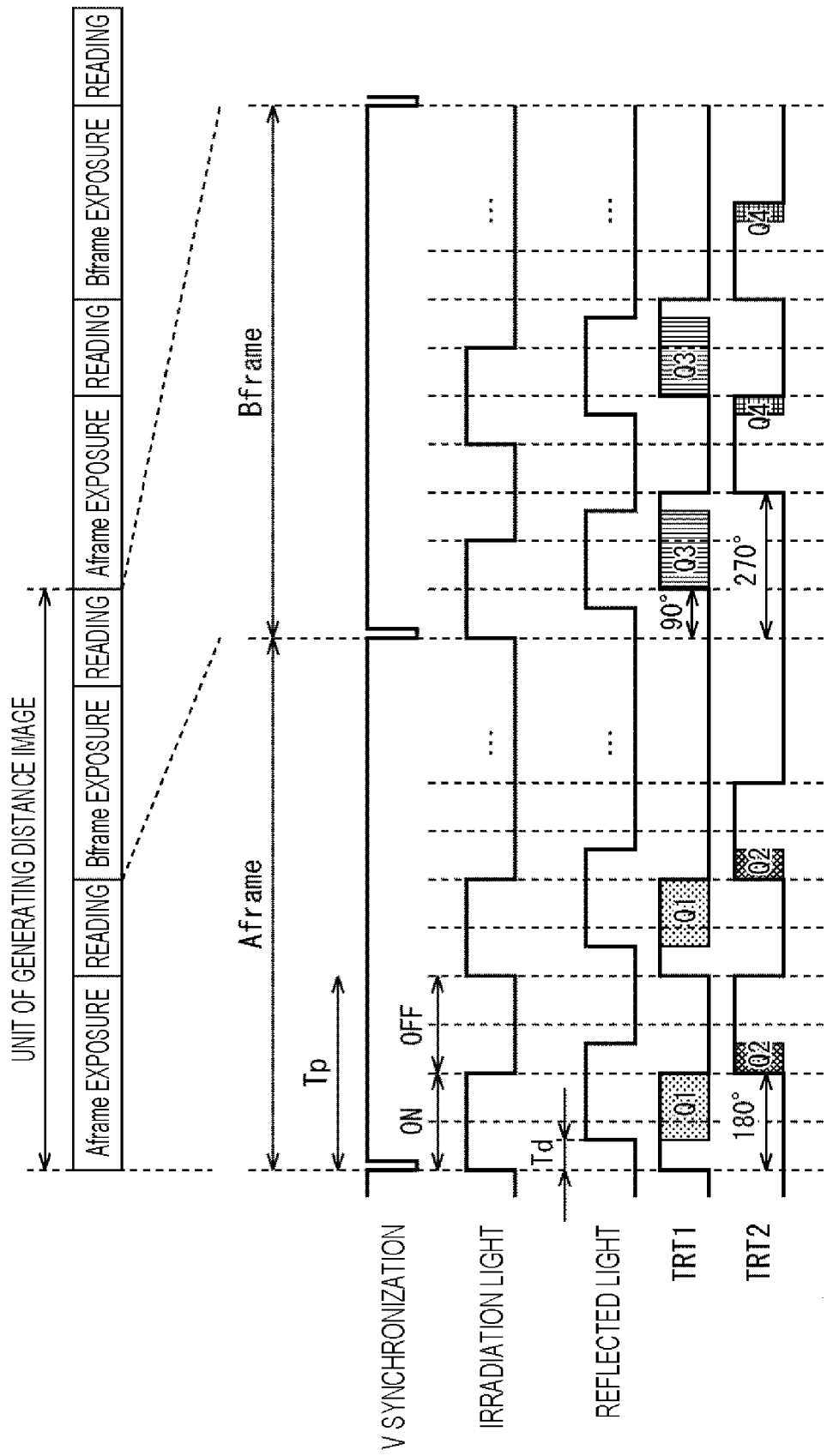
FIG. 5 is a diagram for describing conventional light emission.

In FIG. 5, in the A frame, the transfer control signal TRT1 is turned on at the timing of a phase (Phase 0) same as that of the irradiation light, and light reception is started by the tap 51-1. Further, in the A frame, the transfer control signal TRT2 is turned on at the timing of a phase (Phase 180) shifted by 180 degrees from the phase of the irradiation light, and light reception is started by the tap 51-2.

Further, in the B frame, the transfer control signal TRT1 is turned on at the timing of a phase (Phase 90) shifted by 90 degrees from the phase of the irradiation light, and light reception is started by the tap 51-1. Further, in the B frame, the transfer control signal TRT2 is turned on at the timing of a phase (Phase 270) shifted by 270 degrees from the phase of the irradiation light, and light reception is started by the tap 51-2.

In this case, the taps 51-1 and 51-2 receive light at the timings at which the phase is inverted by 180 degrees. Assuming that the electric charge accumulated in the FD 63-1 of the tap 51-1 at the timing of Phase 0 within the irradiation time Tp in the A frame period is defined as an electric charge Q1, an electric charge Q1' according to the cumulative time of the irradiation times Tp within the A frame period is accumulated in the FD 63-1 in the A frame period. Then, the electric charge Q1' accumulated in the FD 63-1 is read from the FD 63-1 as a signal corresponding to the detection signal SIG1 during the reading period. A signal value of the detection signal SIG1 corresponding to the electric charge Q1' is defined as a signal value I1.

Assuming that the electric charge accumulated in the FD 63-2 of the tap 51-2 at the timing of Phase 180 within the irradiation time Tp in the A frame period is defined as an electric charge Q2, an electric charge Q2' according to the cumulative time of the irradiation times Tp within the A frame period is accumulated in the FD 63-2 in the A frame period. Then, the electric charge Q2' accumulated in the FD 63-2 is read from the FD 63-2 as a signal corresponding to the detection signal SIG2 during the reading period. A signal value of the detection signal SIG2 corresponding to the electric charge Q2' is defined as a signal value I2.

Assuming that the electric charge accumulated in the FD 63-1 of the tap 51-1 at the timing of Phase 90 within the irradiation time Tp in the B frame period is defined as an electric charge Q3, an electric charge Q3' according to the cumulative time of the irradiation times Tp within the B frame period is accumulated in the FD 63-1 in the B frame period. Then, the electric charge Q3' accumulated in the FD 63-1 is read from the FD 63-1 as a signal corresponding to the detection signal SIG1 during the reading period. A signal value of the detection signal SIG1 corresponding to the electric charge Q3' is defined as a signal value I3.

Assuming that the electric charge accumulated in the FD 63-1 of the tap 51-2 at the timing of Phase 270 within the irradiation time Tp in the B frame period is defined as an electric charge Q4, an electric charge Q4' according to the cumulative time of the irradiation times Tp within the B frame period is accumulated in the FD 63-2 in the B frame period. Then, the electric charge Q4' accumulated in the FD 63-2 is read from the FD 63-2 as a signal corresponding to the detection signal SIG2 during the reading period. A signal value of the detection signal SIG2 corresponding to the electric charge Q4' is defined as a signal value I4.

A shift amount θ corresponding to the delay time Td can be detected on the basis of the distribution ratio of the signal value I1, the signal value I2, the signal value I3, and the signal value I4. That is, since the delay time Td is obtained on the basis of the phase shift amount θ, the distance to the target object is obtained from the delay time Td.

The phase shift amount θ is obtained by the following Equation (1), and the distance D to the target object is calculated by the following Equation (2). In Equation (2), C is the speed of light, and Tp is the pulse width.

[Equation 1]

$$\theta = \arctan\left(\frac{I_1 - I_2}{I_3 - I_4}\right) \quad (1)$$

[Equation 2]

$$D = \frac{\theta}{2\pi} \times \left(\frac{T_p C}{2}\right) \quad (2)$$

In this way, the distance to a predetermined target object can be calculated. According to such a distance measuring method, distance measurement less affected by ambient light can be performed. In the above and the following description, it is assumed that only the reflected light of the emitted pulsed light is received, but in reality, various kinds of ambient light other than the emitted pulsed light are also received at the same time. Therefore, the electric charge accumulated in the photodiode 61 is due to the emitted pulsed light and the ambient light.

However, the ambient light can be regarded as stationary with respect to the pulse period, and in a case where the ambient light is stationary, it is considered that the ambient light is equivalently superimposed on the signal value I1, the signal value I2, the signal value I3, and the signal value I4 as an offset. Therefore, in the calculation of Equation (1), the component due to ambient light (offset component) is canceled and does not affect the distance measurement result.

Figure 6:
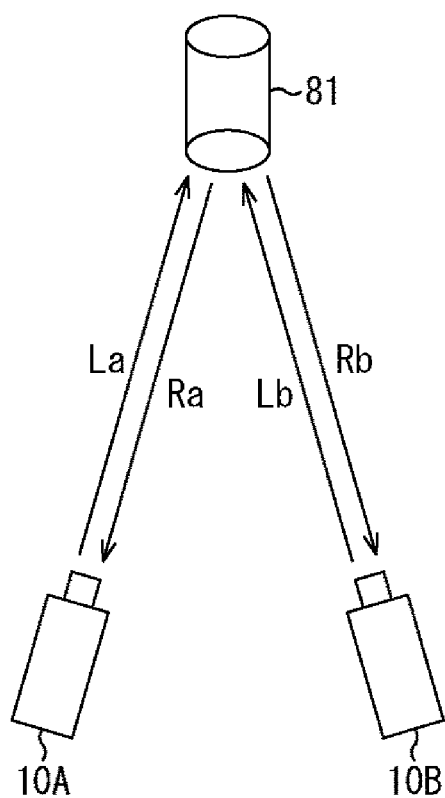
FIG. 6 is a diagram for describing interfering light.

Meanwhile, in a case where there are multiple distance measuring devices 10 that perform distance measurement by the distance measuring method as described with reference to FIG. 5, there is a possibility that they are affected by light emitted from other distance measuring devices. For example, consider a case where a distance measuring device 10A and a distance measuring device 10B measure the distance to an object 81 at the same timing as shown in FIG. 6.

The distance measuring device 10A irradiates the object 81 with irradiation light La and receives reflected light Ra. The distance measuring device 10B irradiates the object 81 with irradiation light Lb and receives reflected light Rb. The reflected light Ra received by the distance measuring device 10A includes reflected light of the irradiation light La emitted by the distance measuring device 10A and reflected light of the irradiation light Lb emitted by the distance measuring device 10B.

Referring to FIG. 5 again, for example, the electric charge Q1 is electric charges accumulated as a result of the object 81 being irradiated with the irradiation light La from the distance measuring device 10A and the irradiation light Lb from the distance measuring device 10B. The irradiation light La and the irradiation light Lb are both pulsed light. Therefore, unlike the above-mentioned ambient light, they are not canceled as an offset component. Thus, the distance measuring device 10A is affected by the irradiation light Lb of the distance measuring device 10B, so that accurate distance measurement may not be possible. This may also occur in the distance measuring device 10B.

As described above, in a case where multiple distance measuring devices that emit high-speed blinking pulsed light and perform distance measurement by a light receiving operation synchronized with the pulsed light are operating at the same time, patterns of the emitted pulsed light interfere with each other, which may raise the possibility that accurate distance measurement cannot be performed due to the influence of interfering light.

In view of this, the distance measuring method to which the present technology capable of accurate distance measurement is applied so that, even if multiple distance measuring devices are operating at the same time, each distance measuring device is not affected by interfering light will be described.

<Distance Measuring Method to which Present Technology is Applied>

Figure 3:
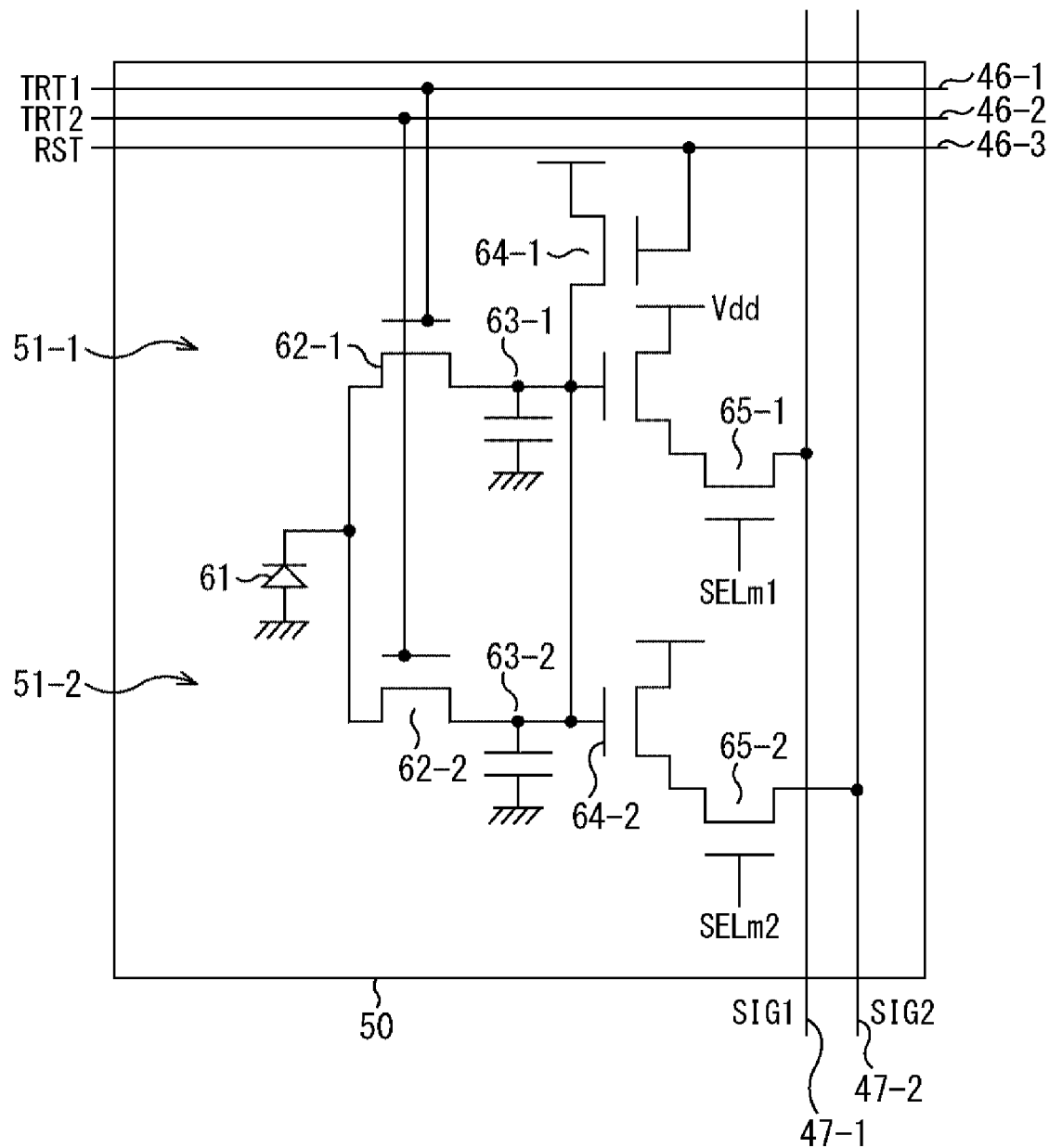
FIG. 3 is a diagram showing a configuration example of a pixel.

The configuration of the distance measuring device that measures the distance by the distance measuring method to which the present technology is applied is shown in FIGS. 1 to 3. The distance measuring method to which the present technology is applied in the distance measuring device 10 having the configuration shown in FIGS. 1 to 3 will be described with reference to FIGS. 7 and 8.

Similar to the case described with reference to FIG. 5, the distance measuring method will be described below taking, as an example, a 2-tap/4-phase method that is a detection method which uses four phases (Phases) and in which electric charges accumulated in one photodiode 61 are read out by using two taps 51.

Figure 7:
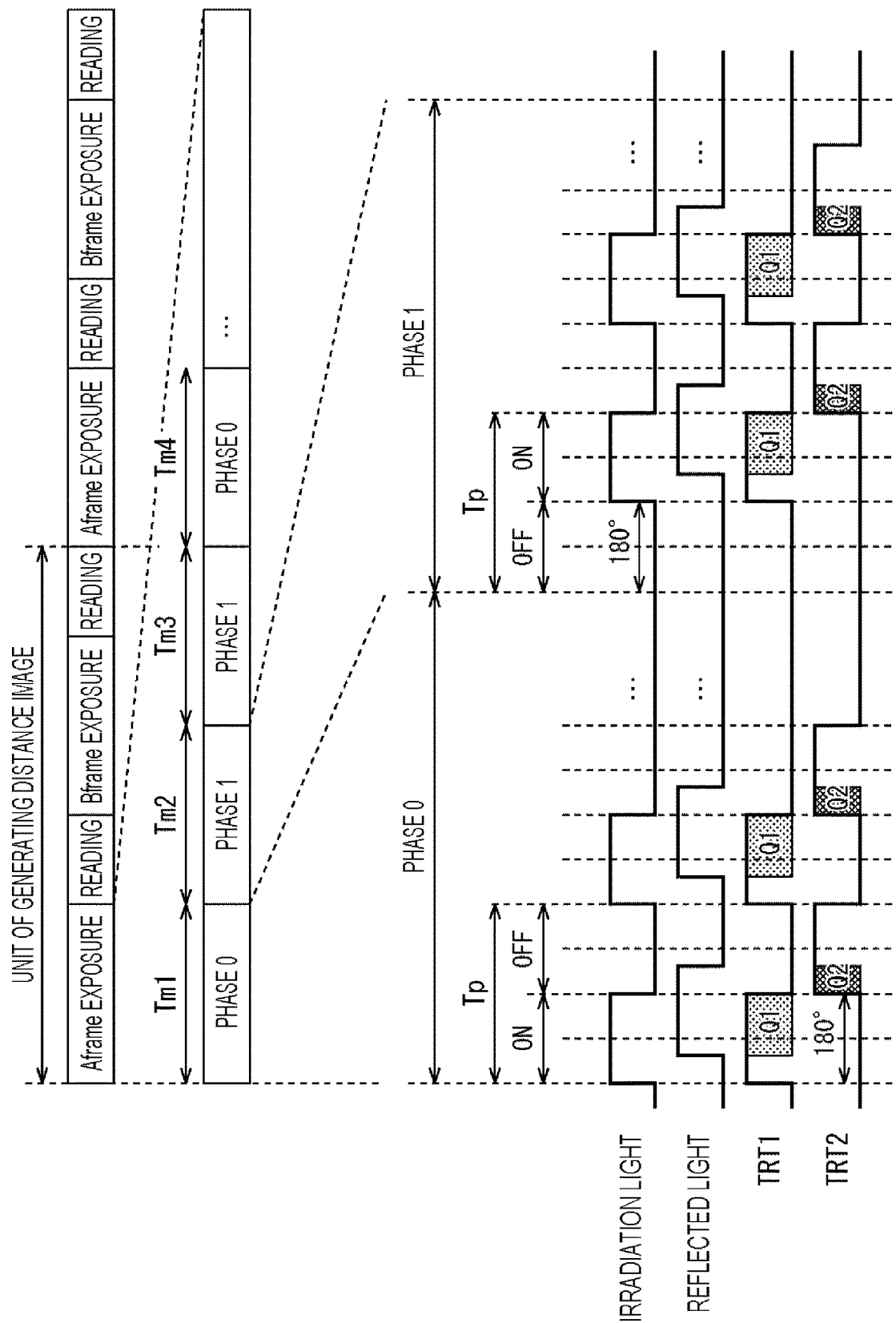
FIG. 7 is a diagram for describing an emission pattern.
Figure 8:
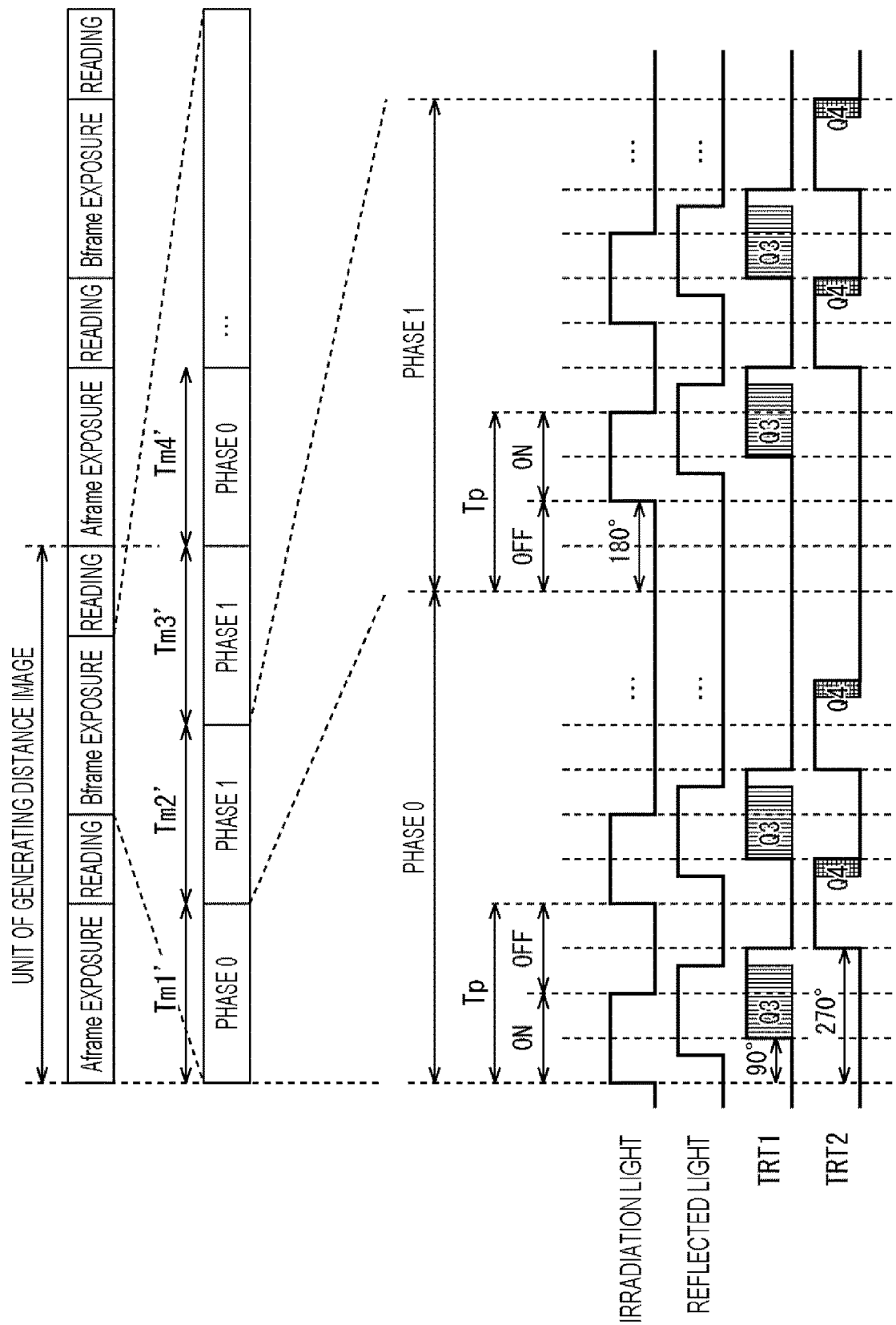
FIG. 8 is a diagram for describing an emission pattern.

One-frame period for generating a distance image includes two frames, an A frame and a B frame. FIG. 7 is a diagram for describing a distance measuring method for the A frame, and FIG. 8 is a diagram for describing a distance measuring method for the B frame.

The A frame and the B frame are each further divided into subframes. One subframe indicates one period when the exposure period of the A frame (B frame) is divided into a plurality of sections.

In a case where the A frame is divided into n subframes, the B frame is also divided into n subframes. That is, the number of subframes in the A frame and the number of subframes in the B frame are the same. The number n of subframes in the A frame (B frame) is 2 or more.

The number of subframes may be fixed or variable. In a case where the number is variable, the number can be changed for each unit of generating a distance image, or can be changed every lapse of a predetermined time.

The period of one subframe is defined as a period Tm. The period Tm is an integral multiple of the irradiation time Tp of the irradiation light. The minimum of the period Tm can be the irradiation time Tp. Further, the maximum of the period Tm can be a half of the exposure period of the A frame. That is, the period Tm can be set as Tm=period Tp at a minimum, and can be set as period Tm=(exposure period of A frame)/2 at a maximum. In a case where the number of subframes is variable, the number is set within the range in which these conditions regarding the period Tm are satisfied.

Within one subframe period, irradiation light modulated so as to repeat on/off of emission in the irradiation time Tp is output from the light emitter 14 (FIG. 1). Two phases are set as timings to turn on the emission. Within the subframe period, light is emitted a plurality of times, and the timing at which the first emission within the subframe period is turned on is controlled on the basis of the set phase.

As the phases, phase 0 and phase 1 are set. Phase 0 is a phase in which the emission is turned on at the timing at which there is no phase shift (hereinafter referred to as a phase 0 emission mode or simply referred to as phase 0, as appropriate), and phase 1 is a phase in which the emission is turned on at the timing at which there is a 180-degree shift (hereinafter referred to as a phase 1 emission mode or simply referred to as phase 1, as appropriate). Here, the description will be continued by taking, as an example, the case where two emission modes are set as the phase emission modes.

In a case where the phase 0 emission mode is set, the light emitter 14 emits light from the start of the subframe. In other words, in the subframe in which the phase 0 emission mode is set, irradiation light is emitted by the light emitter 14 in the emission pattern with the phase of 0 degrees. The transfer control signal TRT1 is turned on in accordance with this light emission. The transfer control signal TRT2 is turned on at a timing at which the phase is shifted by 180 degrees with respect to the transfer control signal TRT1. In the case of phase 0, the same operation as that described with reference to FIG. 5 is performed.

In a case where the phase 1 emission mode is set, the light emitter 14 emits light at the timing at which the phase advances by 180 degrees from the start of the subframe. In other words, in the subframe in which the phase 1 emission mode is set, irradiation light is emitted by the light emitter 14 in the emission pattern with the phase of 180 degrees. In phase 1, the phase of the pulse of emitted light is inverted with respect to the phase in phase 0, that is, delayed by 180 degrees. The transfer control signal TRT1 is turned on at the point at which the light emission is started as in the case of the phase 0 emission mode, and the transfer control signal TRT2 is turned on at the timing at which the phase is shifted by 180 degrees.

Referring to FIG. 7, in the A frame, the subframe period Tm1 is set to the phase 0 emission mode, the subframe period Tm2 is set to the phase 1 emission mode, the subframe period Tm3 is set to the phase 1 emission mode, and the subframe period Tm4 is set to phase 0 emission mode.

Since the subframe period Tm1 is set to the phase 0 emission mode, the emission of irradiation light is turned on at the timing at which the subframe period Tm1 is started without any phase shift. Further, in the subframe period Tm1, the transfer control signal TRT1 is turned on at the timing of a phase (Phase 0) same as the phase of the irradiation light, and light reception is started by the tap 51-1. Further, the transfer control signal TRT2 is turned on at the timing of a phase (Phase 180) shifted by 180 degrees from the phase of the irradiation light, and light reception is started by the tap 51-2.

Since the subframe period Tm2 is set to the phase 1 emission mode, the emission of irradiation light is turned on at the timing at which the phase is shifted by 180 degrees from the starting point of the subframe period Tm2. Further, in the subframe period Tm2, the transfer control signal TRT1 is turned on at the timing of a phase (Phase 0) same as the phase of the irradiation light, so that it is turned on at the timing at which the phase is shifted by 180 degrees from the starting point of the subframe period Tm2, and light reception is started by the tap 51-1. In addition, since the transfer control signal TRT2 is turned on at the timing of a phase (Phase 180) shifted by 180 degrees from the phase of the irradiation light, it is turned on at the timing at which the phase is shifted by 360 degrees from the starting point of the subframe period Tm2, and light reception is started by the tap 51-2.

Since the subframe period Tm3 is set to the phase 1 emission mode, the similar operation to that of the subframe period Tm2 is executed. Since the subframe period Tm4 is set to the phase 0 emission mode, the similar operation to that of the subframe period Tm1 is executed.

In this way, in the A frame period, the phase 0 emission mode or the phase 1 emission mode is set for each subframe period, and the timing of starting emission by the light emitter 14 is controlled on the basis of the set phase.

The same phase in the A frame period is also set in the B frame period. Referring to FIG. 8, in the B frame period, the subframe period Tm1' (the subframe period in the B frame period is given a dash in order to be distinguished from the subframe period in the A frame period) is set to the phase 0 emission mode, the subframe period Tm2' is set to the phase 1 emission mode, the subframe period Tm3' is set to the phase 1 emission mode, and the subframe period Tm4' is set to the phase 0 emission mode, as in the A frame period.

Since the subframe period Tm1' is set to the phase 0 emission mode, the emission of irradiation light is turned on at the timing at which the subframe period Tm1' is started without any phase shift. Further, in the subframe period Tm1', the transfer control signal TRT1 is turned on at the timing of a phase (Phase 90) shifted by 90 degrees from the phase of the irradiation light, and light reception is started by the tap 51-1. Further, the transfer control signal TRT2 is turned on at the timing of a phase (Phase 270) shifted by 270 degrees from the phase of the irradiation light, and light reception is started by the tap 51-2.

Since the subframe period Tm2' is set to the phase 1 emission mode, the emission of irradiation light is turned on at the timing at which the phase is shifted by 180 degrees from the starting point of the subframe period Tm2'. Further, in the subframe period Tm2', the transfer control signal TRT1 is turned on at the timing of a phase (Phase 90) shifted by 90 degrees from the phase of the irradiation light, so that it is turned on at the timing at which the phase is shifted by 270 degrees from the starting point of the subframe period Tm2', and light reception is started by the tap 51-1. In addition, since the transfer control signal TRT2 is turned on at the timing of a phase (Phase 270) shifted by 270 degrees from the phase of the irradiation light, it is turned on at the timing at which the phase is shifted by 450 degrees from the starting point of the subframe period Tm2', and light reception is started by the tap 51-2.

Since the subframe period Tm3' is set to the phase 1 emission mode, the similar operation to that of the subframe period Tm2' is executed. Since the subframe period Tm4' is set to the phase 0 emission mode, the similar operation to that of the subframe period Tm1' is executed.

In this way, control is performed so that the timings of starting light emission by the light emitter 14, in other words, the phases, differ for each subframe. Referring to FIG. 5 again, conventionally, the timing of starting light emission by the light emitter 14 is the same. For example, in the A frame period, irradiation light modulated so as to repeat on/off of emission in the irradiation time Tp with a phase of 0 degrees is output.

On the other hand, referring to FIG. 7 again, in, for example, the A frame period, the exposure period of the A frame period is divided into a plurality of subframes, and the phase at the start of the repetition of on/off of the emission in the irradiation time Tp is set for each subframe. The phase setting is the same between the A frame period and the B frame period.

Which one of phase 0 and phase 1 is used to start emission is set by the pattern switching section 21 (FIG. 1), and the light emission controller 15 controls the light emitter 14 on the basis of the set pattern so that the emission in the light emission pattern in phase 0 or the light emission in the light emission pattern in phase 1 is controlled.

The pattern switching section 21 sets the order of the phase 0 emission mode or the phase 1 emission mode. For example, as described above, the order of phases such as the order of phase 0, phase 1, phase 1, and phase 0 is set. In a case where this is represented by a numerical string, it is 0110. In a case where such a sequence of numerals is represented as a pattern, the pattern switching section 21 performs a process for switching the pattern at a predetermined timing.

The pattern switching section 21 randomly switches between an emission pattern in the phase 0 emission mode and an emission pattern in the phase 1 emission mode.

The predetermined timing at which the pattern switching section 21 switches the pattern is set for each unit of generating a distance image, and the pattern can be switched each time the A frame and the B frame for generating one distance image are acquired.

Alternatively, the pattern can be switched after a predetermined time has elapsed. For example, the pattern can be switched every time a predetermined number of distance images are generated.

Alternatively, the pattern can be set when the distance measuring device 10 starts distance measurement, for example, when the power of the distance measuring device 10 is turned on.

Alternatively, the pattern switching section 21 may store information (pattern) regarding the order of the emission modes generated during manufacture or the like, and read the stored pattern at the timing of switching the pattern. In a case where the pattern switching section 21 is configured to store a pattern, a different pattern is stored for each distance measuring device 10.

The stored pattern can be a numerical string representing the phase 0 emission mode or the phase 1 emission mode, and the number of numerals in the numerical string can be equal to or greater than the number of divisions (number of subframes included in one frame) of the A frame (B frame). For example, in a case where one frame includes 10 subframes, the numerical string may be a string of 10 numerals or a string of 10 or more numerals.

In addition, in a case where a string of numerals equal to or greater than the number of subframes included in one frame is stored, a string including the same number of numerals as the number of subframes is read from the stored numerical string, and the position where the string is read may be randomly selected.

For example, in a case where one frame includes 10 subframes and a numerical string including 100 numerals is stored as a numerical string, a string including 10 out of 100 numerals is read out. The start position of the string to be read is randomly set. For example, a string including 10 numerals from the 10th numeral from the head may be read, or a string including 10 numerals from the 30th numeral from the head may be read.

In a case where the pattern switching section 21 generates a pattern, it includes a random number generator (not shown) that generates a random number, and the pattern is randomly set by a pseudo-random number generated by the random number generator.

In this way, the phase of the emitted pulse is set according to the instruction of the pattern switching section 21.

The set pattern is common to the A frame and the B frame. Therefore, in a case where the pattern (pattern of 0110 represented by a numerical string) of phase 0, phase 1, phase 1, and phase 0 is set in the A frame as shown in FIG. 7, the pattern (pattern of 0110 represented by a numerical string) of phase 0, phase 1, phase 1, and phase 0 is also set in the B frame as shown in FIG. 8.

As described above, the timing of starting emission by the light emitter 14 varies within one frame. Further, the reading timing is set according to the timing of starting emission.

In a case where control is performed so that the timing of emitting irradiation light varies, the distance to the target object is also calculated by detecting the shift amount θ corresponding to the delay time Td with the distribution ratio of the signal value I1, the signal value I2, the signal value I3, and the signal value I4, as in the case described with reference to FIG. 5.

During the A frame period (FIG. 7), electric charge Q1 is accumulated in the FD 63-1 of the tap 51-1 at the timing of Phase 0 in the irradiation time Tp. In the A frame period, the electric charge Q1' corresponding to the cumulative time of the irradiation times Tp within the A frame period is accumulated in the FD 63-1. Then, the signal value I1 of the detection signal SIG1 corresponding to the electric charge Q1' accumulated in the FD 63-1 is read from the FD 63-1 during the reading period.

During the A frame period, electric charge Q2 is accumulated in the FD 63-2 of the tap 51-2 at the timing of Phase 180 in the irradiation time Tp. In the A frame period, the electric charge Q2' corresponding to the cumulative time of the irradiation times Tp within the A frame period is accumulated in the FD 63-2. Then, the signal value I2 of the detection signal SIG2 corresponding to the electric charge Q2' accumulated in the FD 63-2 is read from the FD 63-2 during the reading period.

During the B frame period, electric charge Q3 is accumulated in the FD 63-1 of the tap 51-1 at the timing of Phase 90 in the irradiation time Tp. In the B frame period, the electric charge Q3' corresponding to the cumulative time of the irradiation times Tp within the B frame period is accumulated in the FD 63-1. Then, the signal value I3 of the detection signal SIG1 corresponding to the electric charge Q3' accumulated in the FD 63-1 is read from the FD 63-1 during the reading period.

During the B frame period, electric charge Q4 is accumulated in the FD 63-2 of the tap 51-2 at the timing of Phase 270 in the irradiation time Tp. In the B frame period, the electric charge Q4' corresponding to the cumulative time of the irradiation times Tp within the B frame period is accumulated in the FD 63-2. Then, the signal value I4 of the detection signal SIG2 corresponding to the electric charge Q4' accumulated in the FD 63-2 is read from the FD 63-2 during the reading period.

The shift amount θ corresponding to the delay time Td can be detected on the basis of the distribution ratio of the signal value I1, the signal value I2, the signal value I3, and the signal value I4. That is, since the delay time Td is obtained on the basis of the phase shift amount θ, the distance to the target object is obtained from the delay time Td.

The phase shift amount θ is obtained by Equation (1) described above, and the distance D to the target object is calculated by Equation (2) described above.

In this way, the distance to a predetermined target object can be calculated. According to such a distance measuring method, distance measurement less affected by ambient light can be performed. Further, as described with reference to FIGS. 7 and 8, even if multiple distance measuring devices are operating at the same time, an occurrence of a situation in which patterns of beams of emitted pulsed light interfere with each other is prevented to enable accurate distance measurement by setting the timing (phase) of starting emission of the irradiation light for each subframe.

In other words, even in a case where multiple distance measuring devices that emit beams of high-speed blinking pulsed light and perform distance measurement by a light receiving operation synchronized with the pulsed light are operating at the same time, each of the distance measuring devices can perform accurate distance measurement without being affected by interfering light. This will be further described.

Figure 9:
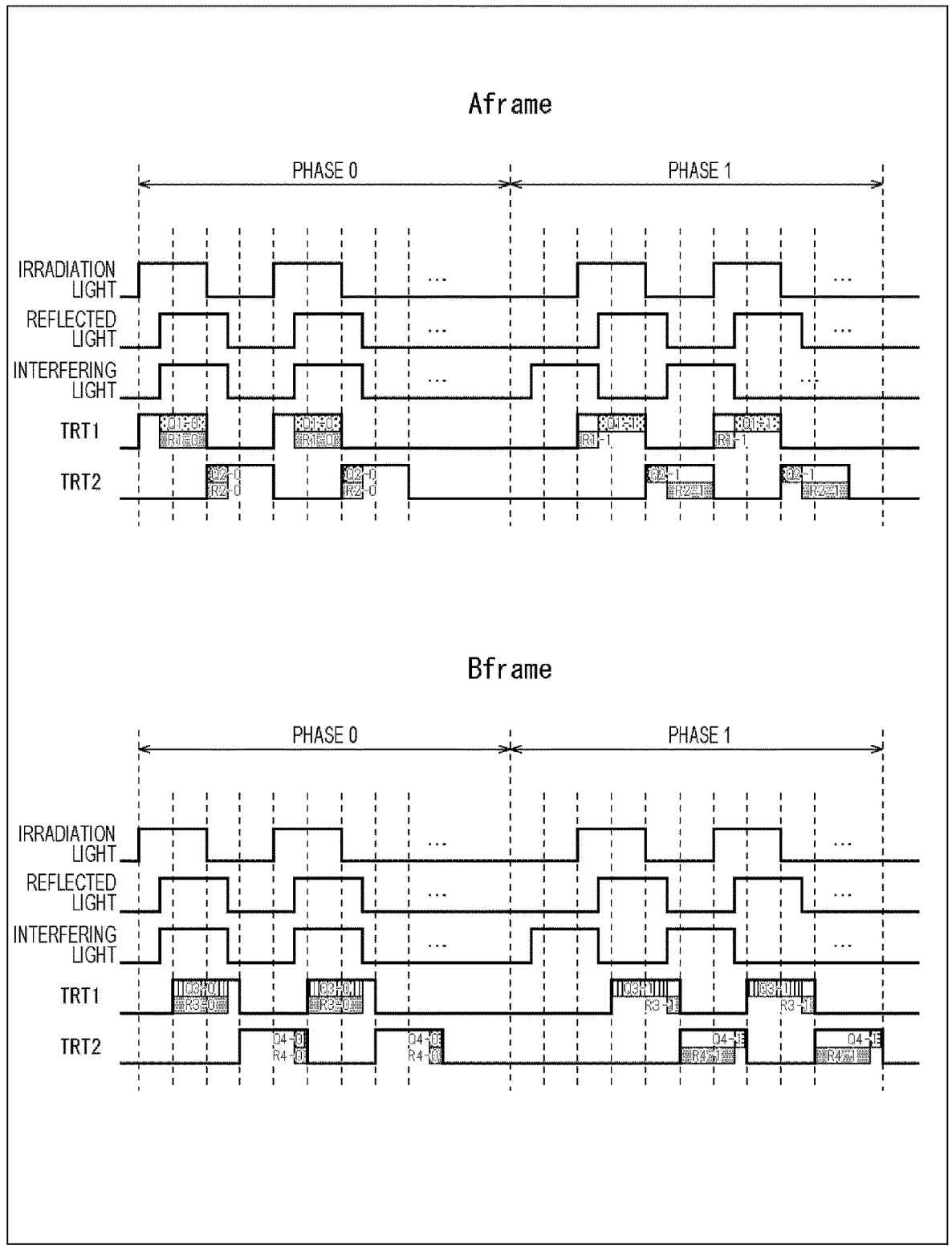
FIG. 9 is a diagram for describing an effect of interfering light.

FIG. 9 is a diagram for describing that the influence of another device on the subject device can be eliminated, in other words, the influence of interfering light can be removed. The upper chart in FIG. 9 is for describing the distance measuring operation in the A frame as in the case shown in FIG. 7, and the lower chart in FIG. 9 is for describing the distance measuring operation in the B frame. FIG. 9 also illustrates not only the reflected light resulting from the irradiation light emitted by the subject device but also the reflected light resulting from the irradiation light emitted by another device as interfering light.

It is supposed that the subject device is the distance measuring device 10A, the other device is the distance measuring device 10B, and the situation is such that the distance measuring device 10A and the distance measuring device 10B are located close to each other to measure the distance to the object 81 as in the case shown in FIG. 6.

The distance measuring device 10A emits irradiation light while varying the phase as described with reference to FIGS. 7 and 8, whereas the distance measuring device 10B emits irradiation light without varying the phase. In the example shown in FIG. 9, the distance measuring device 10A emits light by alternately changing the phase 0 emission mode and the phase 1 emission mode. The distance measuring device 10B continuously emits light in the phase 0 emission mode. In other words, the distance measuring device 10B emits light as described with reference to FIG. 5, or emits light when a pattern in which phase 0 is continuous is set as the phase pattern, as in the conventional distance measuring device.

When emission is performed in phase 0 of the A frame, electric charge Q1-0 is accumulated in the FD 63-1 of the tap 51-1 of the distance measuring device 10A by receiving the reflected light due to light emitted by the distance measuring device 10A. Further, electric charge R1-0 is accumulated in the FD 63-1 of the tap 51-1 of the distance measuring device 10A by receiving interfering light due to light emitted by the distance measuring device 10B.

When emission is performed in phase 0 of the A frame, electric charge Q2-0 is accumulated in the FD 63-2 of the tap 51-2 of the distance measuring device 10A by receiving reflected light due to light emitted by the distance measuring device 10A. Further, electric charge R2-0 is accumulated in the FD 63-2 of the tap 51-2 of the distance measuring device 10A by receiving interfering light due to light emitted by the distance measuring device 10B.

When emission is performed in phase 1 of the A frame, electric charge Q1-1 is accumulated in the FD 63-1 of the tap 51-1 of the distance measuring device 10A by receiving reflected light due to light emitted by the distance measuring device 10A. Further, electric charge R1-1 is accumulated in the FD 63-1 of the tap 51-1 of the distance measuring device 10A by receiving interfering light due to light emitted by the distance measuring device 10B.

When emission is performed in phase 1 of the A frame, electric charge Q2-1 is accumulated in the FD 63-2 of the tap 51-2 of the distance measuring device 10A by receiving reflected light due to light emitted by the distance measuring device 10A. Further, electric charge R2-1 is accumulated in the FD 63-2 of the tap 51-2 of the distance measuring device 10A by receiving interfering light due to light emitted by the distance measuring device 10B.

When emission is performed in phase 0 of the B frame, electric charge Q3-0 is accumulated in the FD 63-1 of the tap 51-1 of the distance measuring device 10A by receiving reflected light due to light emitted by the distance measuring device 10A. Further, electric charge R3-0 is accumulated in the FD 63-1 of the tap 51-1 of the distance measuring device 10A by receiving interfering light due to light emitted by the distance measuring device 10B.

When emission is performed in phase 0 of the B frame, electric charge Q4-0 is accumulated in the FD 63-2 of the tap 51-2 of the distance measuring device 10A by receiving reflected light due to light emitted by the distance measuring device 10A. Further, electric charge R4-0 is accumulated in the FD 63-2 of the tap 51-2 of the distance measuring device 10A by receiving interfering light due to light emitted by the distance measuring device 10B.

When emission is performed in phase 1 of the B frame, electric charge Q3-1 is accumulated in the FD 63-1 of the tap 51-1 of the distance measuring device 10A by receiving reflected light due to light emitted by the distance measuring device 10A. Further, electric charge R3-1 is accumulated in the FD 63-1 of the tap 51-1 of the distance measuring device 10A by receiving interfering light due to light emitted by the distance measuring device 10B.

When emission is performed in phase 1 of the B frame, electric charge Q4-1 is accumulated in the FD 63-2 of the tap 51-2 of the distance measuring device 10A by receiving reflected light due to light emitted by the distance measuring device 10A. Further, electric charge R4-1 is accumulated in the FD 63-2 of the tap 51-2 of the distance measuring device 10A by receiving interfering light due to light emitted by the distance measuring device 10B.

As described above, the distance measuring device 10A is affected by interfering light of the distance measuring device 10B. For example, when irradiation is performed in phase 0 of the A frame, the electric charge Q1-0 and electric charge R1-0 are accumulated in the FD 63-1 of the distance measuring device 10A, and electric charge Q2-0 and electric charge R2-0 are accumulated in the FD 63-2. Further, when irradiation is performed in phase 1 of the A frame, the electric charge Q1-1 and electric charge R1-1 are accumulated in the FD 63-1 of the distance measuring device 10A, and electric charge Q2-1 and electric charge R2-1 are accumulated in the FD 63-2.

The value obtained by adding the electric charge R1-0 accumulated due to an influence of interfering light during irradiation in phase 0 and electric charge R1-1 accumulated due to an influence of interfering light during irradiation in phase 1 are defined as a value R1. The value obtained by adding the electric charge R2-0 accumulated due to an influence of interfering light during irradiation in phase 0 and electric charge R2-1 accumulated due to an influence of interfering light during irradiation in phase 1 are defined as a value R2.

The value R1 and the value R2 are the same (substantially the same). Therefore, in Equation (1) above for obtaining the phase, the value R1 corresponding to the value I1 and the value R2 corresponding to the value I2 are subtracted, so that the received component of the interfering light is canceled, and thus, the influence of the interfering light during position detection can be eliminated.

In this way, in the A frame, the influence of the received component of the interfering light can be removed, which can prevent a decrease in accuracy of position detection. Further, in the B frame as well, the received component of the interfering light can be canceled, whereby the influence of interfering light during position detection can be reduced, as in the A frame.

That is, in the B frame, the value obtained by adding the electric charge R3-0 accumulated due to an influence of interfering light during irradiation in phase 0 and electric charge R3-1 accumulated due to an influence of interfering light during irradiation in phase 1 is similarly defined as a value R3 as shown in the lower chart of FIG. 9. The value obtained by adding the electric charge R4-0 accumulated due to an influence of interfering light during irradiation in phase 0 and electric charge R4-1 accumulated due to an influence of interfering light during irradiation in phase 1 is defined as a value R4.

The value R3 and the value R4 are the same (substantially the same). Therefore, in Equation (1) above for obtaining the phase, the value R3 corresponding to the value I3 and the value R4 corresponding to the value I4 are subtracted, so that the received component of the interfering light is canceled, and thus, the influence of the interfering light during position detection can be eliminated.

This can be expressed by Equation (3) below which is obtained by substituting numerical values into Equation (1).

[Equation 3]

$$\theta = \arctan\left(\frac{I_1 - I_2 + R1 - R2}{I_3 - I_4 + R3 - R4}\right) = \arctan\left(\frac{I_1 - I_2}{I_3 - I_4}\right) \quad (3)$$

In Equation (3), R1=R2 and R3=R4, and therefore, Equation (3) is eventually the same as Equation (1). As described above, it can be confirmed from the equation that the influence of interfering light can be eliminated by applying the present technology.

Due to the configuration as described above in which, in each of the distance measuring devices 10, the order of phase emission modes is determined by a unique random number pattern, even if multiple distance measuring devices 10 are placed close to each other and affected by another distance measuring device 10A, the emission pattern of the other distance measuring device 10 can be set so as not to have a correlation with the reading timing of the subject distance measuring device 10. Therefore, the received component of light of the other distance measuring device 10 can be equally distributed to the tap 51-1 and the tap 51-2.

Therefore, in Equation (1) above which is the phase detection equation, the received component of light of the other distance measuring device 10 is canceled, so that the distance detection is enabled without being interfered with the emission pattern of the other distance measuring device 10.

Note that, in the example described with reference to FIG. 9, two distance measuring devices, the distance measuring device 10A and the distance measuring device 10B, are close to each other, and the distance measuring device 10B continuously emits light in phase 0. However, even in a case where multiple distance measuring devices 10 to which the present technology is applied are located close to one another, distance detection is enabled without being interfered with the emission pattern of light emitted from another distance measuring device 10.

Each of the multiple distance measuring devices 10 is set to have a pattern of the phase 0 emission mode and the phase 1 emission mode, and performs emission control based on the set pattern. Focusing on one of the multiple distance measuring devices 10, the correlation between the emission pattern of the other distance measuring device 10 and the reading phase (four Phases where Q1 to Q4 are read in the above example) of the subject distance measuring device 10 is low. When the correlation is decreased, light reception signals from the other distance measuring devices 10 are substantially equally distributed to each Phase. Therefore, in Equation (1) above which is the phase detection equation, the components due to the light reception signals from the other distance measuring devices 10 are canceled.

Therefore, when a pattern of light emission is set for each of the plurality of distance measuring devices 10, each distance measuring device 10 can detect the distance without being affected by the other distance measuring devices 10.

Further, even if the multiple distance measuring devices 10 include a distance measuring device 10 to which the present technology is not applied, the distance can be detected without being affected by light emitted from such distance measuring device 10. For example, even in a case where a device, such as the distance measuring device 10B shown in FIG. 9, which continuously emits light in phase 0 without changing the emission pattern is located close to the distance measuring device 10A, the distance measuring device 10A enables distance detection without being affected by the distance measuring device 10B as described with reference to FIG. 9.

By applying the present technology, reflected light due to light emitted by the other distance measuring device 10 can be treated the same as the stationary ambient light, and thus, distance measurement can be performed more accurately.

Even in a case where there is a device that blinks light but does not perform distance measurement, and the distance measuring device to which the present technology is applied interferes with and is affected by blinking light of such device, the distance measuring device 10 can cancel the interference due to blinking light in the same manner as described above, thereby being capable of detecting distance with high accuracy. That is, according to the present technology, it is possible to reduce the influence (interference) of various kinds of light blinking noise, and it is possible to detect distance more accurately.

Further, since phase modulation is performed within the pulse period Tp in the light emission according to the present technology, the light emission can be performed without changing the total time of emitting light. For example, Patent Documents 2 and 3 propose to provide a period in which light is not emitted in order to prevent interference. However, by providing a period in which light is not emitted, a total emission time within a period for generating one distance image (one frame) is reduced, for example, and thus, the detection sensitivity may be decreased. Alternatively, in order to make the total emission time equivalent to that in the case where the present technology is applied, the pulse period Tp increases, because there is the period in which light is not emitted. Therefore, the exposure sensitivity may decrease.

However, since phase modulation is performed within the pulse period Tp in the light emission according to the present technology as described above, the light emission can be performed without changing the total time of emitting light. Therefore, it is possible to avoid interference with other devices without decreasing the exposure sensitivity.

The abovementioned embodiment describes an example in which the phase emission mode includes the phase 0 (=0 degrees) emission mode and the phase 1 (=180 degrees) emission mode. However, any other emission modes may be set. For example, four phase emission modes may be set as shown in FIG. 10, and these phase emission modes may be changed by generating a pseudo-random number.

Figure 10:
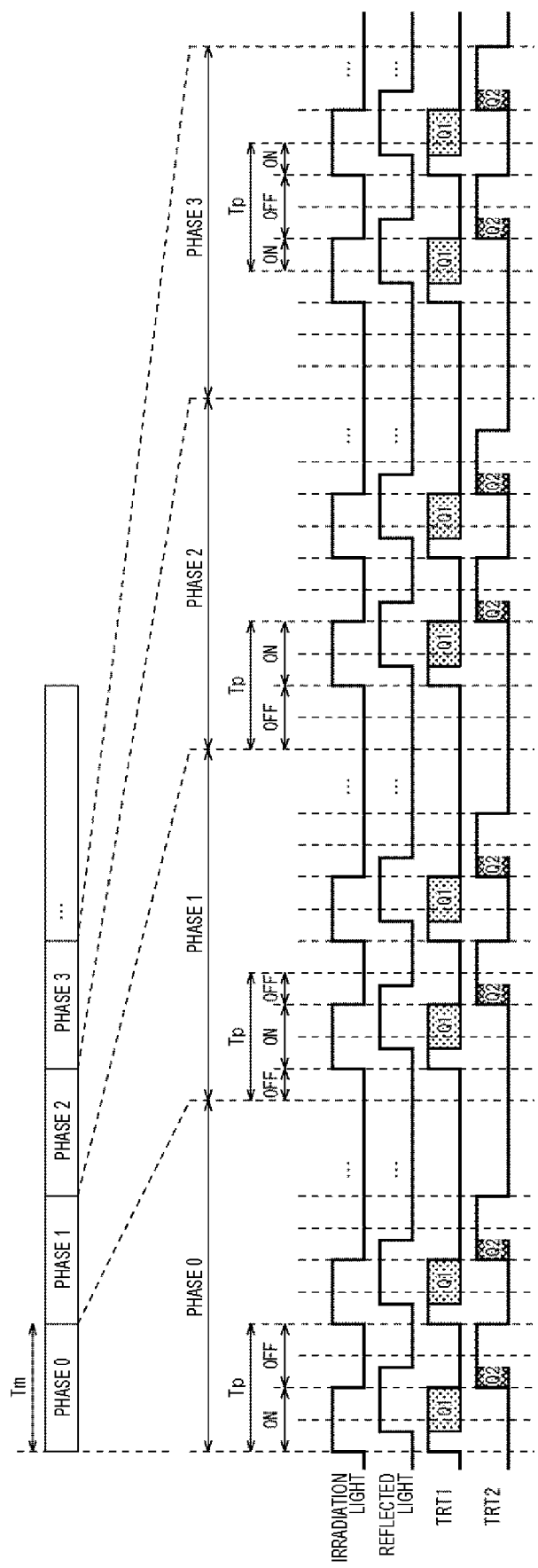
FIG. 10 is a diagram for describing another emission pattern.

Referring to FIG. 10, a phase 0 emission mode, a phase 1 emission mode, a phase 2 emission mode, and a phase 3 emission mode are set as the phase emission mode. In the phase 0 emission mode, emission is turned on at the timing at which there is no phase shift. In the phase 1 emission mode, emission is turned on at the timing at which there is a 90-degree shift.

In the phase 2 emission mode, emission is turned on at the timing at which there is a 180-degree shift. In the phase 3 emission mode, emission is turned on at the timing at which there is a 270-degree shift.

In a case where the phase 0 emission mode is set, the light emitter 14 emits light from the start of the subframe. In a case where the phase 1 emission mode is set, the light emitter 14 emits light at the timing at which the phase advances by 90 degrees from the start of the subframe.

In a case where the phase 2 emission mode is set, the light emitter 14 emits light at the timing at which the phase advances by 180 degrees from the start of the subframe. In a case where the phase 3 emission mode is set, the light emitter 14 emits light at the timing at which the phase advances by 270 degrees from the start of the subframe.

In this way, four types of phase emission modes may be set, and as in the above embodiment, pseudo-random numbers may be generated, and emission patterns may be set according to the pseudo-random numbers. The present technology can be applied to a case where two types of phase emission modes, three types of phase emission modes, or four types of phase emission modes are set. Further, for example, in a case where two types of phase emission modes are set, they are the phase 0 (=0 degrees) emission mode and the phase 1 (=180 degrees) emission mode in the above example. However, the combination is not limited thereto. For example, the present technology can be applied to a case where phase emission modes of 0 degrees and 90 degrees are set, or the case where phase emission modes of 90 degrees and 270 degrees are set.

Furthermore, the present technology can also be applied to a case where four or more kinds of phase emission modes are set. The phase may be set from 0 to 359 degrees. If the phase is set in 1 degree intervals, emission modes of phase 0 to phase 359 corresponding to 0 to 359 degrees are set, and an emission pattern according to the combination of the emission modes of phase 0 to phase 359 is set.

Even if the phase is set in 10-degree intervals instead of 1-degree intervals, emission modes of phase 0 to phase 35 corresponding to 0 to 350 degrees are set, and an emission pattern according to the combination of the emission modes of phase 0 to phase 35 is set. Therefore, the possibility of overlap with the emission pattern of another device can be reduced.

As described above, the phase emission mode may be discrete phase modulation such as 0 degrees or 90 degrees, or may be modulation finely set so as to be treated as continuous phase modulation. In a case where the phase emission mode is set such that it can be treated as continuous phase modulation, a numerical value generated as a pseudo-random number may be used as the phase. For example, if the generated pseudo-random number is 50, 50 degrees may be set as the phase.

The present technology can be applied to the indirect TOF method described above. The present technology can also be applied to a direct TOF method. For example, the present technology can be applied to a LIDAR system that uses the direct TOF method. That is, the present technology can be applied to the direct TOF method with which measurement is performed in a direct time domain, and to the indirect TOF method with which measurement is performed using a variation in physical quantity dependent on TOF and a time standard for converting the variation into a temporal variation.

Further, the present technology can be applied not only to a device related to distance measurement but also to a device that synchronously receives reflected light due to emitted pulsed light.

Further, although the abovementioned embodiment describes, as an example, a 2-tap/4-phase TOF sensor, the present technology can also be applied to a TOF sensor of another type. For example, the present technology can be applied to a 4-tap/4-phase TOF sensor as shown in FIG. 11.

Figure 11:
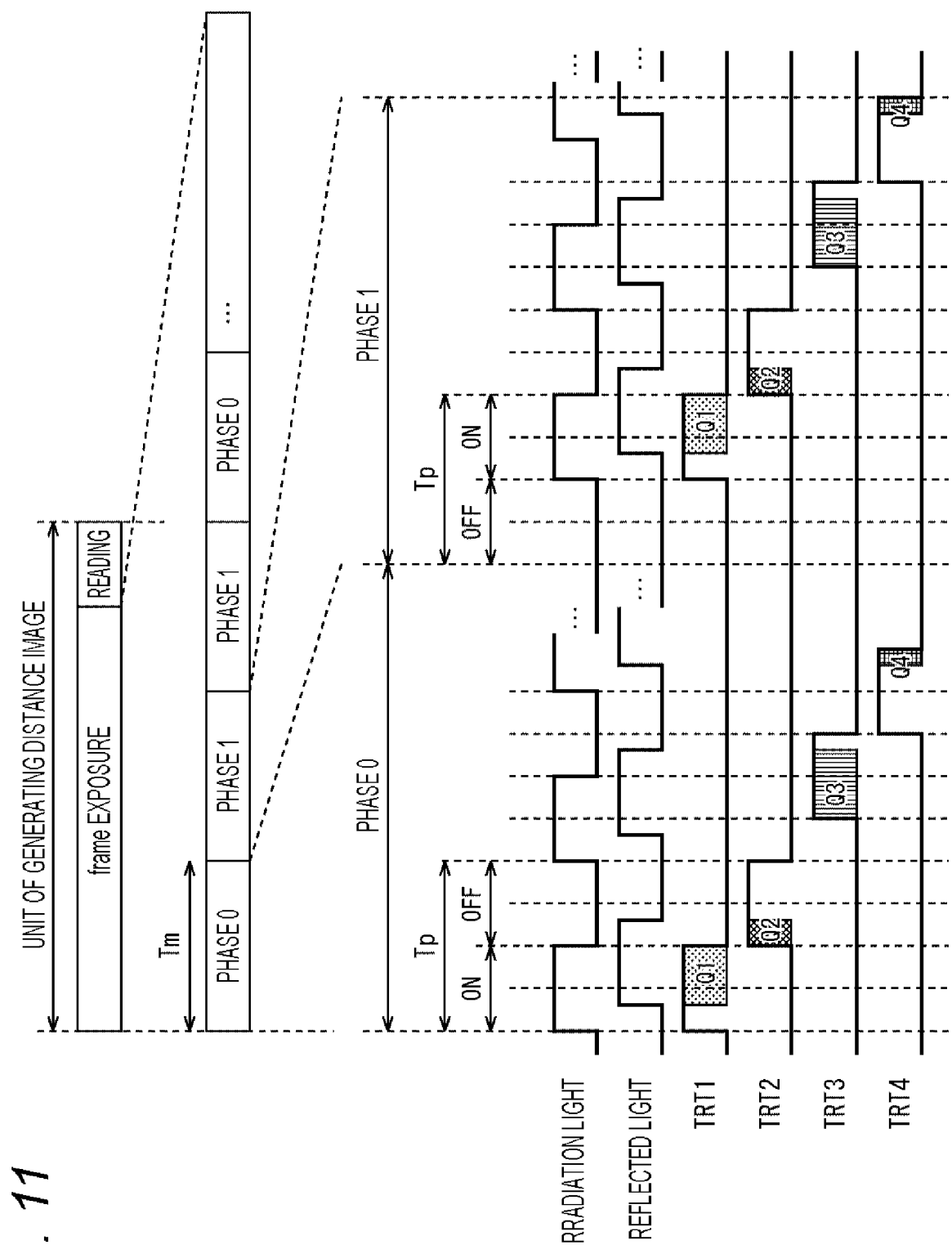
FIG. 11 is a diagram for describing another reading method.

Similar to, for example, FIG. 7, FIG. 11 is a diagram for describing a distance measuring method to which the present technology is applied in the distance measuring device 10, and for describing a distance measuring method using a 4-tap/4-phase method.

The 4-tap/4-phase TOF sensor is a sensor having four reading sections corresponding to the tap 51 described above. In the example shown in FIG. 11, a tap (referred to as tap TRT1) controlled by a transfer control signal TRT1, a tap (referred to as tap TRT2) controlled by a transfer control signal TRT2, a tap (referred to as tap TRT3) controlled by a transfer control signal TRT3, and a tap (referred to as tap TRT4) controlled by a transfer control signal TRT4 correspond to four taps.

In one frame which is a unit of generating a distance image, reading with a phase (Phase 0) same as the phase of irradiation light is performed by the tap TRT1, and reading with a phase (Phase 180) shifted by 180 degrees from the phase of the irradiation light is performed by the tap TRT2.

Further, reading with a phase (Phase 90) shifted by 90 degrees from the phase of irradiation light is performed by the tap TRT3, and reading with a phase (Phase 270) shifted by 270 degrees from the phase of the irradiation light is performed by the tap TRT4.

As described above, according to the 4-tap/4-phase TOF sensor, a process equivalent to the 2-tap/4-phase method in one frame can be performed without using two frames such as A frame and B frame. That is, the present technology can be applied to a case where one frame is divided into a plurality of subframes, and a phase of irradiation light is changed for each subframe, and the present technology can be applied to both a 2-tap/4-phase TOF sensor and a 4-tap/4-phase TOF sensor.

In the abovementioned embodiment, the length of the subframe period Tm is fixed, but the length of the subframe period Tm can be further changed to prevent interference.

FIG. 7 is referred to again. The A frame is divided into n subframes, and the periods Tm1 and Tm2 to Tmn of the n subframes are set to the same length. The length of the period Tm of the subframe may be changed. In the example shown in FIG. 7, the individual lengths of the periods Tm1 and Tm2 to Tmn may be different from one another.

In a case where the length of the period Tm varies, the phase pattern may be set by generating a pseudo-random number, or the phase pattern may be stored in advance and read out as needed, as in the phase pattern described above. Due to the configuration in which the pattern of the subframe period Tm and the emission pattern in the subframe are both varied, the possibility of overlap with the pattern of pulsed light from another device can be reduced, whereby it is possible to perform distance measurement with less affected by interfering light.

<Recording Medium>

The series of processes described above can be executed by hardware or by software. In a case where the series of processes is executed by software, a program constituting the software is installed on a computer. Here, the computer includes a computer embedded in dedicated hardware and, for example, a general-purpose personal computer capable of executing various functions by installing various programs.

Figure 12:
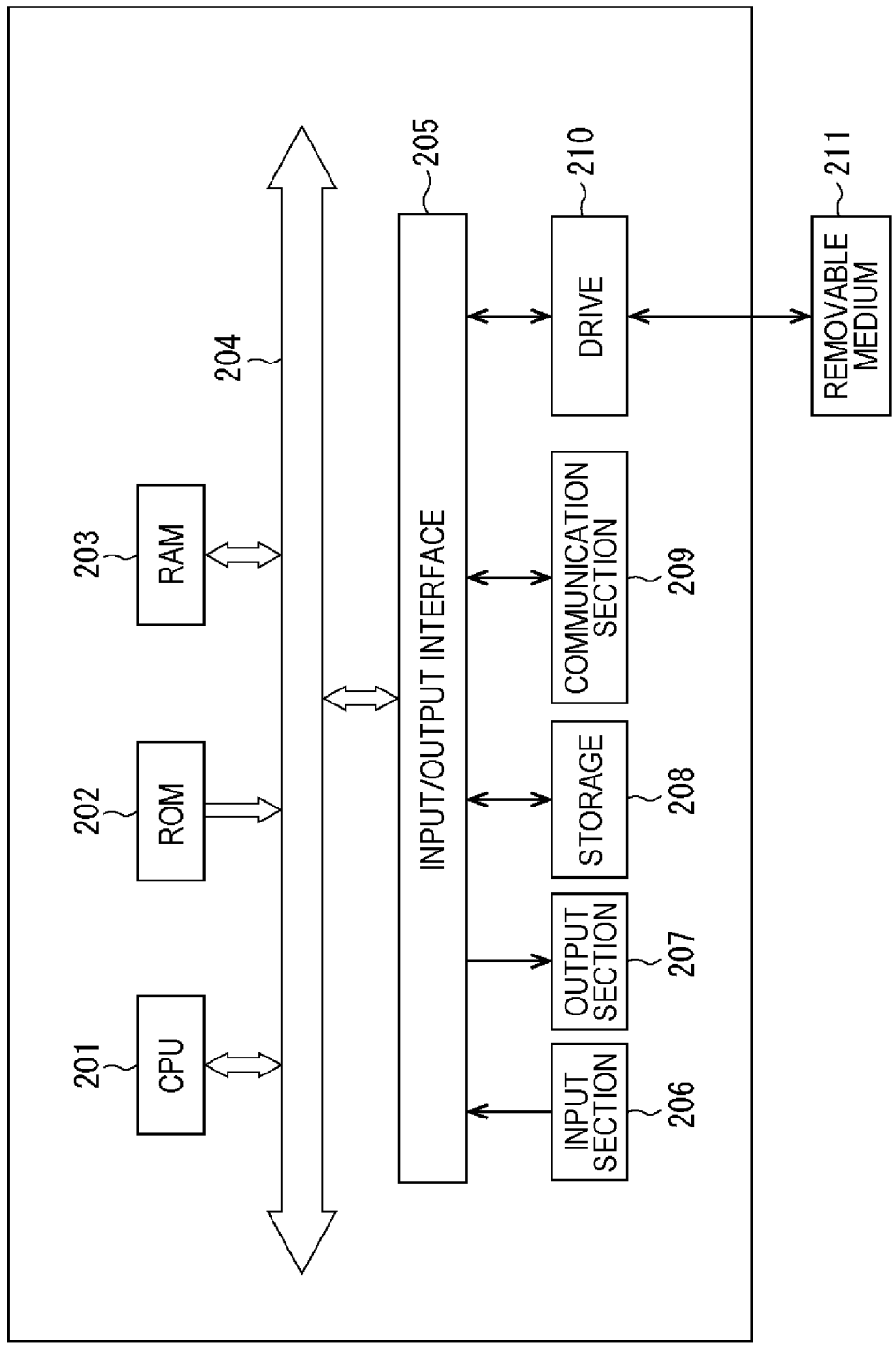
FIG. 12 is a diagram for describing a recording medium.

FIG. 12 is a block diagram showing a configuration example of the hardware of a computer that executes the abovementioned series of processes programmatically. In the computer, a central processing unit (CPU) 201, a read only memory (ROM) 202, and a random access memory (RAM) 203 are connected to each other by a bus 204. An input/output interface 205 is further connected to the bus 204. An input section 206, an output section 207, a storage 208, a communication section 209, and a drive 210 are connected to the input/output interface 205.

The input section 206 includes a keyboard, a mouse, a microphone, and the like. The output section 207 includes a display, a speaker, and the like. The storage 208 includes a hard disk, a non-volatile memory, and the like. The communication section 209 includes a network interface and the like. The drive 210 drives a removable medium 211 such as a magnetic disk, an optical disk, a magneto-optical disk, or a semiconductor memory.

In the computer configured as described above, the CPU 201 loads the program stored in, for example, the storage 208 into the RAM 203 via the input/output interface 205 and the bus 204, and executes the program, whereby the series of processes described above is performed.

The program executed by the computer (CPU 201) can be recorded and provided on the removable medium 211 as a package medium or the like, for example. In addition, the program can also be provided via a wired or wireless transmission medium such as a local area network, the Internet, and digital satellite broadcasting.

In the computer, the program can be installed in the storage 208 via the input/output interface 205 by loading the removable medium 211 in the drive 210. Further, the program can be received by the communication section 209 and installed in the storage 208 via a wired or wireless transmission medium. In addition, the program can be pre-installed in the ROM 202 or the storage 208.

Note that the program executed by the computer may be a program in which processes are carried out in a time series in the order described in this specification or may be a program in which processes are carried out in parallel or at necessary timings, such as when the processes are called.

<Example of Application to Mobile Object>

The technology according to the present disclosure (present technology) can be applied to various products. For example, the technology according to the present disclosure may be implemented as a device to be mounted on any type of mobile objects such as vehicles, electric vehicles, hybrid electric vehicles, motorcycles, bicycles, personal mobilities, airplanes, drones, ships, and robots.

Figure 13:
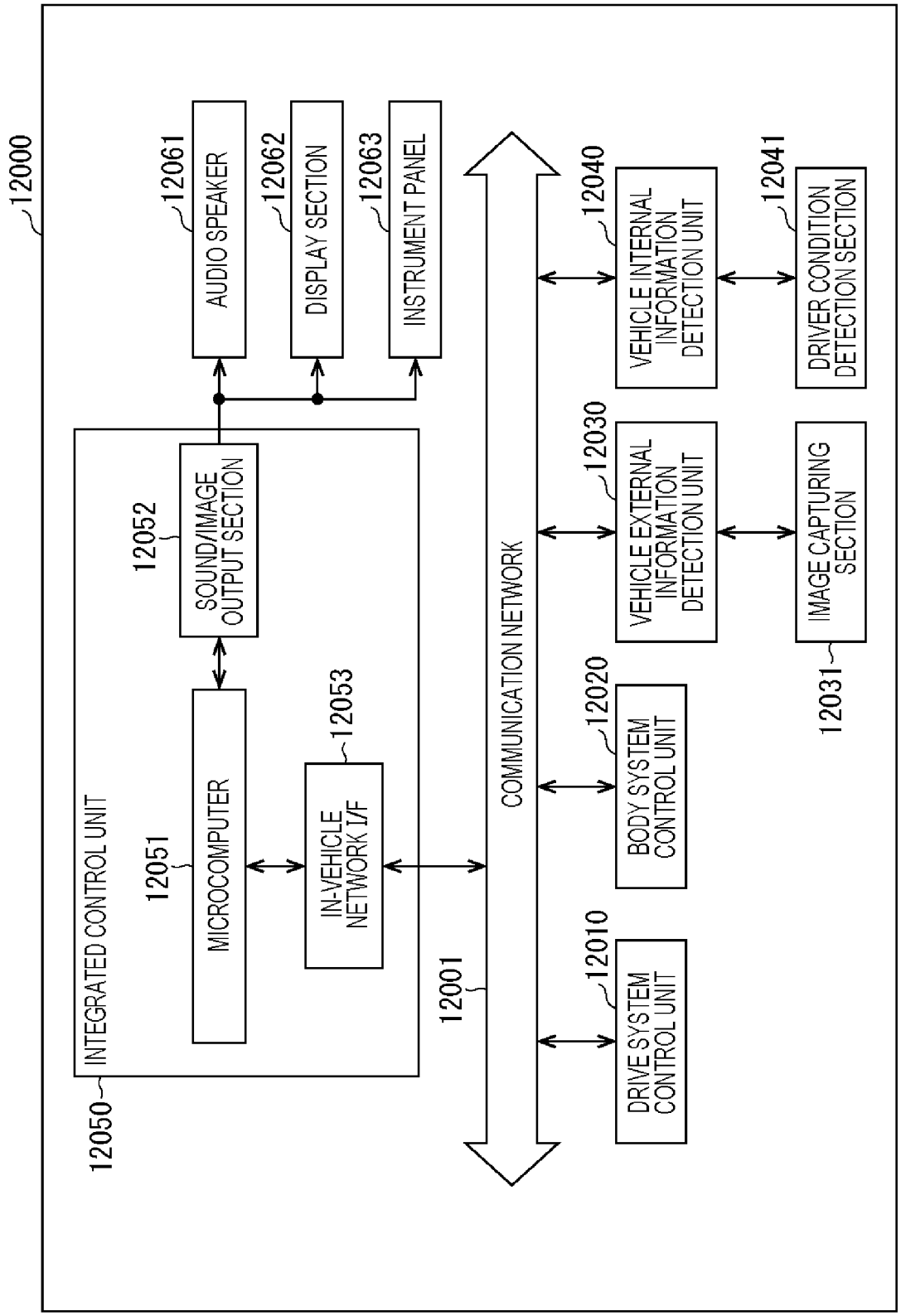
FIG. 13 is a block diagram showing an example of a schematic configuration of a vehicle control system.

FIG. 13 is a block diagram showing a schematic configuration example of a vehicle control system which is an example of a mobile object control system to which the technology according to the present disclosure can be applied.

The vehicle control system 12000 includes a plurality of electronic control units connected to each other via a communication network 12001. In the example shown in FIG. 13, the vehicle control system 12000 includes a drive system control unit 12010, a body system control unit 12020, a vehicle external information detection unit 12030, a vehicle internal information detection unit 12040, and an integrated control unit 12050. Further, as the functional configuration of the integrated control unit 12050, a microcomputer 12051, a sound/image output section 12052, and an in-vehicle network interface (I/F) 12053 are illustrated.

The drive system control unit 12010 controls the operation of devices related to a drive system of a vehicle according to various programs. For example, the drive system control unit 12010 functions as a control device over a driving force generating device such as an internal combustion engine or a driving motor for generating a driving force of the vehicle, a driving force transmission mechanism for transmitting the driving force to wheels, a steering mechanism adjusting a steering angle of the vehicle, a braking device that generates a braking force of the vehicle, and the like.

The body system control unit 12020 controls operations of various devices mounted on the vehicle body according to various programs. For example, the body system control unit 12020 functions as a keyless entry system, a smart key system, a power window device, or a control device for various lamps such as a headlamp, a backup lamp, a brake lamp, a blinker, or a fog lamp. In this case, the body system control unit 12020 can receive radio waves transmitted from a portable device that can be used as a key or signals from various switches. The body system control unit 12020 receives input of these radio waves or signals, and controls a door lock device, power window device, lamps, and the like of the vehicle.

The vehicle external information detection unit 12030 detects information regarding the outside of the vehicle equipped with the vehicle control system 12000. For example, the vehicle external information detection unit 12030 is connected with an image capturing section 12031.

The vehicle external information detection unit 12030 causes the image capturing section 12031 to capture an image outside the vehicle, and receives the captured image. The vehicle external information detection unit 12030 may perform, on the basis of the received image, a process of detecting an object such as a person, a vehicle, an obstacle, a road sign, or a character on a road surface, or a process of detecting the distance thereto.

The image capturing section 12031 is an optical sensor that receives light and outputs an electric signal corresponding to the amount of received light. The image capturing section 12031 can output an electric signal as an image or as information for distance measurement. Further, the light received by the image capturing section 12031 may be visible light or invisible light such as infrared rays.

The vehicle internal information detection unit 12040 detects information regarding the inside of the vehicle. For example, the vehicle internal information detection unit 12040 is connected with a driver condition detection section 12041 that detects a condition of a driver. The driver condition detection section 12041 may include, for example, a camera that captures an image of the driver. On the basis of detection information input from the driver condition detection section 12041, the vehicle internal information detection unit 12040 may calculate a degree of fatigue of the driver or a degree of concentration of the driver, or may determine whether or not the driver is dozing.

The microcomputer 12051 can calculate a control target value for the driving force generating device, the steering mechanism, or the braking device on the basis of the information about the inside and outside of the vehicle obtained by the vehicle external information detection unit 12030 or the vehicle internal information detection unit 12040, and output a control command to the drive system control unit 12010. For example, the microcomputer 12051 may perform cooperative control intended to implement functions of an advanced driver assistance system (ADAS) which include collision avoidance or shock mitigation for the vehicle, following driving based on distance between vehicles, vehicle speed maintaining driving, a warning of collision of the vehicle, a warning of lane departure of the vehicle, or the like.

In addition, the microcomputer 12051 may perform cooperative control intended for automatic driving, which makes the vehicle to travel autonomously without the need of the operation of the driver, or the like, by controlling the driving force generating device, the steering mechanism, the braking device, or the like on the basis of the information about the surrounding situation of the vehicle obtained by the vehicle external information detection unit 12030 or the vehicle internal information detection unit 12040.

Further, the microcomputer 12051 can output a control command to the body system control unit 12030 on the basis of information about the outside of the vehicle acquired by the vehicle external information detection unit 12030. For example, the microcomputer 12051 may perform cooperative control including controlling the head lamps on the basis of the location of a preceding vehicle or an oncoming vehicle detected by the vehicle external information detection unit 12030 and changing high beams to low beams, for example, for the purpose of anti-glare.

The sound/image output section 12052 transmits an output signal of at least one of a sound or an image to an output device capable of visually or auditorily giving information to an occupant of the vehicle or the outside of the vehicle. In the example of FIG. 13, an audio speaker 12061, a display section 12062, and an instrument panel 12063 are illustrated as the output device. The display section 12062 may include, for example, at least one of an on-board display or a head-up display.

Figure 14:
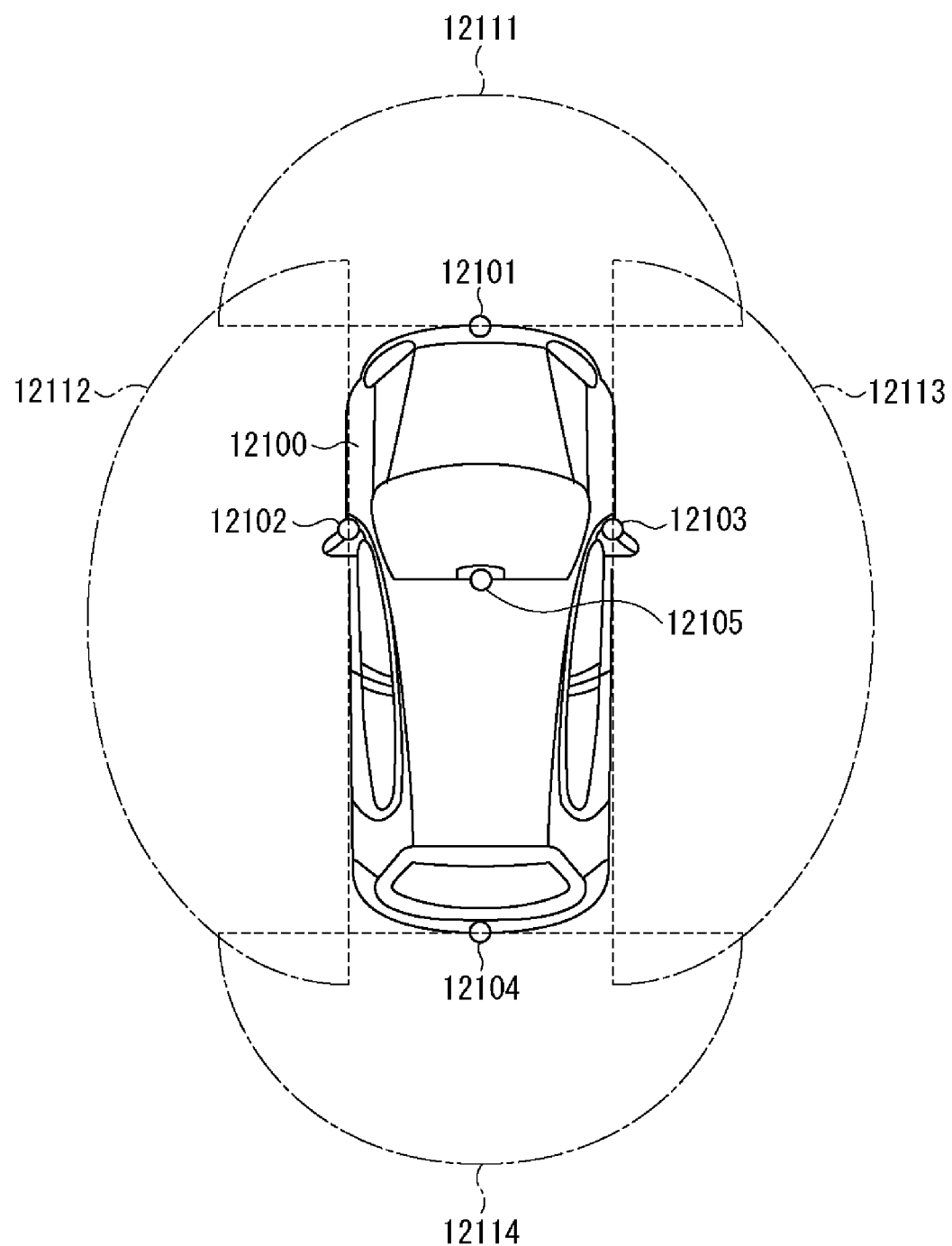
FIG. 14 is an explanatory diagram showing an example of installation positions of a vehicle external information detector and image capturing sections.

FIG. 14 is a diagram showing examples of mounting positions of the image capturing sections 12031.

In FIG. 14, a vehicle 12100 includes, as the image capturing section 12031, image capturing sections 12101, 12102, 12103, 12104, and 12105.

For example, the image capturing sections 12101, 12102, 12103, 12104, and 12105 are provided at positions such as the front nose, the side-view mirrors, the rear bumper or the back door, and an upper part of the windshield in the cabin of the vehicle 12100. The image capturing section 12101 provided on the front nose and the image capturing section 12105 provided at the upper part of the windshield in the cabin of the vehicle mainly acquire an image of an environment in front of the vehicle 12100. The image capturing sections 12102 and 12103 on the side-view mirrors mainly obtain an image of an environment on the side of the vehicle 12100. The image capturing section 12104 provided in the rear bumper or the back door mainly obtains an image of an environment behind the vehicle 12100. The image capturing section 12105 provided at the upper part of the windshield in the cabin of the vehicle is mainly used for detecting a preceding vehicle, a pedestrian, an obstacle, a traffic light, a traffic sign, a lane, or the like.

Note that FIG. 14 shows examples of imaging ranges of the image capturing sections 12101 to 12104. The image capturing range 12111 indicates the image capturing range of the image capturing section 12101 on the front nose, the image capturing ranges 12112 and 12113 indicate the image capturing ranges of the image capturing sections 12102 and 12103 on the side-view mirrors, respectively, and the image capturing range 12114 indicates the image capturing range of the image capturing section 12104 on the rear bumper or the back door. For example, a bird's-eye image of the vehicle 12100 as viewed from above can be obtained by superimposing image data captured by the image capturing sections 12101 to 12104.

At least one of the image capturing sections 12101 to 12104 may have a function of obtaining distance information. For example, at least one of the image capturing sections 12101 to 12104 may be a stereo camera including a plurality of imaging elements or an imaging element including pixels for phase difference detection.

For example, the microcomputer 12051 obtains the distance between the vehicle 12100 and each three-dimensional object in the image capturing ranges 12111 to 12114 and the temporal change (relative speed to the vehicle 12100) of the distance on the basis of the distance information obtained from the image capturing sections 12101 to 12104, and may extract, as a preceding vehicle, especially a three-dimensional object which is the closest to the vehicle 12100 on the path on which the vehicle 12100 is traveling and which is traveling at a predetermined speed (e.g., 0 km/h or more) in the direction substantially the same as the traveling direction of the vehicle 12100. Further, the microcomputer 12051 may perform autobrake control (including follow-up stop control), automatic acceleration control (including follow-up start-driving control), and the like by presetting a distance to be maintained between the vehicle 12100 and a preceding vehicle. In this way, it is possible to perform cooperative control intended to achieve automatic driving without the need of drivers' operations, and the like.

For example, the microcomputer 12051 may sort three-dimensional object data of three-dimensional objects into motorcycles, standard-size vehicles, large-size vehicles, pedestrians, and the other three-dimensional objects such as utility poles on the basis of the distance information obtained from the image capturing sections 12101 to 12104, extract data, and use the data to automatically avoid obstacles. For example, the microcomputer 12051 sorts obstacles around the vehicle 12100 into obstacles that a driver of the vehicle 12100 can see and obstacles that it is difficult for the driver to see. Then, the microcomputer 12051 determines a collision risk, which indicates a hazard level of a collision with each obstacle. When the collision risk is equal to or higher than a preset value and thus there is a possibility of collision, the microcomputer 12051 may perform driving assistance to avoid a collision by outputting a warning to the driver via the audio speaker 12061 or the display section 12062, or by forcibly reducing the speed or performing collision-avoidance steering via the drive system control unit 12010.

At least one of the image capturing sections 12101 to 12104 may be an infrared camera that detects infrared light. For example, the microcomputer 12051 may determine whether or not images captured by the image capturing sections 12101 to 12104 include a pedestrian, and recognize the pedestrian. The method of recognizing a pedestrian includes, for example, a step of extracting feature points in the images captured by the image capturing sections 12101 to 12104 being infrared cameras, and a step of performing a pattern matching process with respect to a series of feature points indicating an outline of an object, to thereby determine whether or not the object is a pedestrian. When the microcomputer 12051 determines that the images captured by the image capturing sections 12101 to 12104 include a pedestrian and recognizes the pedestrian, the sound/image output section 12052 controls the display section 12062 such that a rectangular contour is displayed overlaid on the recognized pedestrian to emphasize the pedestrian. Further, the sound/image output section 12052 may control the display section 12062 such that an icon or the like indicating a pedestrian is displayed at a desired position.

Further, in the present specification, the system represents an entire device constituted by a plurality of devices.

It should be noted that the effects described in the present specification are merely illustrative and not restrictive, and may have additional effects.

It should be noted that embodiments of the present technology are not limited to the abovementioned embodiment, and various modifications are possible without departing from the gist of the present technology.

Note that the present technology may also have the following configurations.

(1)

A distance measuring device including:
  a light emitter that emits irradiation light;
  a light receiver that receives reflected light resulting from reflection of the irradiation light on a target object;
  a calculator that calculates a distance to the target object on the basis of a time from emission of the irradiation light to reception of the reflected light; and
  a light emission controller that controls the light emitter,
  in which the light emission controller controls emission by the light emitter by switching a first emission mode and a second emission mode different from the first emission mode within a predetermined frame.

(2)

The distance measuring device according to (1) mentioned above,
  in which the light emission controller randomly switches the first emission mode and the second emission mode.

(3)

The distance measuring device according to (1) or (2) mentioned above,
in which the predetermined frame has a first subframe and a second subframe, and
the light emission controller applies the first emission mode in the first subframe, and applies the second emission mode in the second subframe.

(4)

The distance measuring device according to any one of (1) to (3) mentioned above,
in which the light emitter emits pulsed light, and
the first emission mode and the second emission mode differ in a phase of the pulsed light.

(5)

The distance measuring device according to (4) mentioned above,
in which the phase is set discretely or continuously.

(6)

The distance measuring device according to (4) mentioned above,
in which the phase is any one of 0 degrees, 90 degrees, 180 degrees, and 270 degrees.

(7)

The distance measuring device according to any one of (1) to (3) mentioned above,
in which the light emitter emits pulsed light, and
the first emission mode and the second emission mode differ in a timing of starting emission of the pulsed light.

(8)

The distance measuring device according to (3) mentioned above,
in which the first subframe and the second subframe differ in length of period.

(9)

The distance measuring device according to any one of (1) to (8) mentioned above,
in which the light emission controller switches the first emission mode and the second emission mode on the basis of stored information regarding an order of emission modes.

(10)

The distance measuring device according to any one of (1) to (9) mentioned above,
in which, in the predetermined frame, the distance measuring device distributes electric charge generated by reception of the reflected light by the light receiver to a first tap and a second tap, and detects a first detection signal according to electric charge accumulated in the first tap and a second detection signal according to electric charge accumulated in the second tap,
in a frame next to the predetermined frame, the distance measuring device distributes electric charge generated by reception of the reflected light by the light receiver to the first tap and the second tap, and detects a third detection signal according to electric charge accumulated in the first tap and a fourth detection signal according to electric charge accumulated in the second tap, and
the calculator calculates the distance to the target object using the first to fourth detection signals.

(11)

The distance measuring device according to any one of (1) to (9) mentioned above,
in which, in the predetermined frame, the distance measuring device distributes electric charge generated by reception of the reflected light by the light receiver to first to fourth taps, and detects a first detection signal according to electric charge accumulated in the first tap, a second detection signal according to electric charge accumulated in the second tap, a third detection signal according to electric charge accumulated in the third tap, and a fourth detection signal according to electric charge accumulated in the fourth tap, and
the calculator calculates the distance to the target object using the first to fourth detection signals.

(12)

The distance measuring device according to any one of (1) to (11) mentioned above, in which the distance measuring device is an indirect time of flight (TOF) sensor.

(13)

The distance measuring device according to any one of (1) to (11) mentioned above, in which the distance measuring device is a direct time of flight (TOF) sensor.

(14)

The distance measuring device according to any one of (1) to (13) mentioned above, in which the light emission controller controls emission by the light emitter by switching the first emission mode, the second emission mode, a third emission mode different from the first and second emission modes, and a fourth emission mode different from the first to third emission modes within the predetermined frame.

(15)

The distance measuring device according to (14) mentioned above, in which the second emission mode differs from the first emission mode in phase by 90 degrees, the third emission mode differs from the first emission mode in phase by 180 degrees, and the fourth emission mode differs from the first emission mode in phase by 270 degrees.

(16)

A distance measuring method including:
emitting irradiation light;
receiving reflected light resulting from reflection of the irradiation light on a target object;
calculating a distance to the target object on the basis of a time from emission of the irradiation light to reception of the reflected light; and
controlling emission of the irradiation light,
the method being executed by a distance measuring device that performs a distance measurement process,
in which, in the control of emission, a first emission mode and a second emission mode different from the first emission mode are switched within a predetermined frame to control emission.

(17)

A program for causing a computer of a distance measuring device that performs a distance measurement process to execute processing including:
emitting irradiation light;
receiving reflected light resulting from reflection of the irradiation light on a target object;
calculating a distance to the target object on the basis of a time from emission of the irradiation light to reception of the reflected light; and
controlling emission of the irradiation light,
the processing including, during the control of emission, switching between a first emission mode and a second emission mode different from the first emission mode within a predetermined frame to control emission.

REFERENCE SIGNS LIST

10 Distance measuring device
11 Lens

12 Light receiver
13 Signal processor
14 Light emitter
15 Light emission controller
21 Pattern switching section
22 Distance image generator
31 Photodiode
41 Pixel array section
42 Vertical driver
43 Column processor
44 Horizontal driver
45 System controller
46 Pixel drive line
47 Vertical signal line
48 Signal processor
50 Pixel
51 Tap
61 Photodiode
62 Transfer transistor
63 FD section
64 Selection transistor
65 Reset transistor
81 Object

The invention claimed is:

1. A distance measuring device, comprising:
a light emitter configured to emit irradiation light;
a light receiver configured to:
   receive reflected light resulting from reflection of the irradiation light on a target object;
   divide electric charge, associated with the received reflected light, among a first tap, a second tap, a third tap, and a fourth tap;
   accumulate a first electric charge in the first tap, a second electric charge in the second tap, a third electric charge in the third tap, and a fourth electric charge in the fourth tap;
   output a first detection signal based on the first electric charge;
   output a second detection signal based on the second electric charge;
   output a third detection signal based on the third electric charge; and
   output a fourth detection signal based on the fourth electric charge;
a calculator configured to calculate a distance to the target object, based on the first detection signal, the second detection signal, the third detection signal, and the fourth detection signal; and
a light emission controller configured to control the emission of the irradiation light by the light emitter based on a switching operation of a mode of the light emitter between a first emission mode and a second emission mode, within a first specific frame, wherein
   the first emission mode includes a first phase of the irradiation light,
   the second emission mode includes a second phase of the irradiation light,
   the second emission mode is different from the first emission mode, and
   in the first emission mode, the light receiver is further configured to sequentially control:
      the first tap, based on a first transfer control signal having a 0 degree phase shift with respect to the first phase of the irradiation light;
      the second tap, based on a second transfer control signal having a 180 degrees phase shift with respect to the first phase of the irradiation light;
      the third tap, based on a third transfer control signal having a 90 degrees phase shift with respect to the first phase of the irradiation light; and
      the fourth tap based on a fourth transfer control signal having a 270 degrees phase shift with respect to the first phase of the irradiation light.

2. The distance measuring device according to claim 1, wherein the light emission controller is further configured to randomly switch the mode of the light emitter between the first emission mode and the second emission mode.

3. The distance measuring device according to claim 1, wherein
   the first specific frame includes a first subframe and a second subframe, and
   the light emission controller is further configured to:
      apply the first emission mode in the first subframe, and
      apply the second emission mode in the second subframe.

4. The distance measuring device according to claim 1, wherein
   the light emitter is further configured to emit pulsed light, and
   the first emission mode and the second emission mode differ in a phase of the pulsed light.

5. The distance measuring device according to claim 4, wherein the phase of the pulsed light is one of discrete or continuous.

6. The distance measuring device according to claim 4, wherein the phase of the pulsed light is one of 0 degrees, 90 degrees, 180 degrees, or 270 degrees.

7. The distance measuring device according to claim 1, wherein
   the light emitter is further configured to emit pulsed light, and
   the first emission mode and the second emission mode differ in a time of start of the emission of the pulsed light.

8. The distance measuring device according to claim 3, wherein
   the first subframe has a first length of period,
   the second subframe has a second length of period, and
   the second length of period is different from the first length of period.

9. The distance measuring device according to claim 1, wherein the light emission controller is further configured to switch the mode of the light emitter between the first emission mode and the second emission mode, based on stored information regarding an order of emission modes.

10. The distance measuring device according to claim 1, wherein the distance measuring device is an indirect time of flight (TOF) sensor.

11. The distance measuring device according to claim 1, wherein the distance measuring device is a direct time of flight (TOF) sensor.

12. The distance measuring device according to claim 1, wherein
   the light emission controller is further configured to control the emission of the irradiation light based on the switching operation of the mode of the light emitter between the first emission mode, the second emission mode, a third emission mode, and a fourth emission mode,
   the third emission mode includes a third phase of the irradiation light, the fourth emission mode includes a fourth phase of the irradiation light, and the first emission mode, the second emission mode, the third emission mode, and the fourth emission mode are different.

13. The distance measuring device according to claim 12, wherein the second emission mode is different from the first emission mode in phase by 90 degrees, the third emission mode is different from the first emission mode in phase by 180 degrees, and the fourth emission mode is different from the first emission mode in phase by 270 degrees.

14. A distance measuring method, comprising:

emitting irradiation light;

receiving reflected light resulting from reflection of the irradiation light on a target object;

dividing electric charge, associated with the received reflected light, among a first tap, a second tap, a third tap, and a fourth tap;

accumulating a first electric charge in the first tap, a second electric charge in the second tap, a third electric charge in the third tap, and a fourth electric charge in the fourth tap;

outputting a first detection signal based on the first electric charge;

outputting a second detection signal based on the second electric charge;

outputting a third detection signal based on the third electric charge;

outputting a fourth detection signal based on the fourth electric charge;

calculating a distance to the target object, based on the first detection signal, the second detection signal, the third detection signal, and the fourth detection signal;

controlling the emission of the irradiation light based on a switching operation of a mode of a light emitter between a first emission mode and a second emission mode, within a specific frame, wherein the first emission mode includes a first phase of the irradiation light, the second emission mode includes a second phase of the irradiation light, and the second emission mode is different from the first emission mode; and sequentially controlling in the first emission mode:

the first tap, based on a first transfer control signal having a 0 degree phase shift with respect to the first phase of the irradiation light;

the second tap, based on a second transfer control signal having a 180 degrees phase shift with respect to the first phase of the irradiation light;

the third tap, based on a third transfer control signal having a 90 degrees phase shift with respect to the first phase of the irradiation light; and the fourth tap based on a fourth transfer control signal having a 270 degrees phase shift with respect to the first phase of the irradiation light.

15. A non-transitory computer-readable medium having stored thereon, computer-executable instructions which, when executed by a computer, cause the computer to execute operations, the operations comprising:

emitting irradiation light;

receiving reflected light resulting from reflection of the irradiation light on a target object;

dividing electric charge, associated with the received reflected light, among a first tap, a second tap, a third tap, and a fourth tap;

accumulating a first electric charge in the first tap, a second electric charge in the second tap, a third electric charge in the third tap, and a fourth electric charge in the fourth tap;

outputting a first detection signal based on the first electric charge;

outputting a second detection signal based on the second electric charge;

outputting a third detection signal based on the third electric charge;

outputting a fourth detection signal based on the fourth electric charge;

calculating a distance to the target object, based on the first detection signal, the second detection signal, the third detection signal, and the fourth detection signal;

controlling the emission of the irradiation light based on a switching operation of a mode of a light emitter between a first emission mode and a second emission mode, within a specific frame, wherein the first emission mode includes a first phase of the irradiation light, the second emission mode includes a second phase of the irradiation light, and the second emission mode is different from the first emission mode; and sequentially controlling in the first emission mode:

the first tap, based on a first transfer control signal having a 0 degree phase shift with respect to the first phase of the irradiation light;

the second tap, based on a second transfer control signal having a 180 degrees phase shift with respect to the first phase of the irradiation light;

the third tap, based on a third transfer control signal having a 90 degrees phase shift with respect to the first phase of the irradiation light; and the fourth tap based on a fourth transfer control signal having a 270 degrees phase shift with respect to the first phase of the irradiation light.

* * * * *